United States Patent
Kojina

(10) Patent No.: US 8,799,708 B2
(45) Date of Patent: Aug. 5, 2014

(54) INFORMATION PROCESSING APPARATUS, CONTROL DEVICE, AND ABNORMAL UNIT DETERMINATION METHOD

(75) Inventor: Shigeo Kojina, Kahoku (JP)

(73) Assignee: Fujitsu Limited, Kawasaki (JP)

( * ) Notice: Subject to any disclaimer, the term of this patent is extended or adjusted under 35 U.S.C. 154(b) by 186 days.

(21) Appl. No.: 13/346,820

(22) Filed: Jan. 10, 2012

(65) Prior Publication Data
US 2012/0246510 A1 Sep. 27, 2012

(30) Foreign Application Priority Data

Mar. 22, 2011 (JP) .................................. 2011-063404

(51) Int. Cl.
*G06F 11/00* (2006.01)
*G06F 11/20* (2006.01)

(52) U.S. Cl.
CPC ...................................... *G06F 11/20* (2013.01)
USPC .................................. 714/11; 714/25; 714/48

(58) Field of Classification Search
CPC .................................. G06F 11/20; H04L 1/22
USPC ............................................. 714/42, 44, 25
See application file for complete search history.

(56) References Cited

U.S. PATENT DOCUMENTS

| 7,010,639 B2 | 3/2006 | Larson et al. |
| 2006/0031618 A1 | 2/2006 | Hansquine et al. |
| 2010/0131801 A1* | 5/2010 | Baleani et al. .................. 714/37 |
| 2010/0268989 A1* | 10/2010 | Otani et al. ..................... 714/25 |

FOREIGN PATENT DOCUMENTS

| JP | 2005-004745 A | 1/2005 |
| JP | 2010-055472 A | 3/2010 |
| JP | 2010-211810 A | 9/2010 |

* cited by examiner

*Primary Examiner* — Sarai Butler
(74) *Attorney, Agent, or Firm* — Fujitsu Patent Center

(57) ABSTRACT

An information processing apparatus determines an abnormal unit by: determining whether or not there is an abnormal point in access to a slave unit by a first master unit that controls a plurality of slave units connected by a serial bus; requesting a second master unit having redundancy with the first master unit to access a specific slave unit when the abnormal point is determined to exist in access to the specific slave unit in the determining; and determining a unit having an abnormality by use of an access result relating to the abnormal point determined to have an abnormality in the determining and an access result indicating a result of the request made in the requesting.

6 Claims, 25 Drawing Sheets

FIG.4

41 — ABNORMALITY DETERMINATION INFORMATION OF OPERATING SVC 41A

41B — ABNORMALITY DETERMINATION INFORMATION OF STANDBY SVC

41C — ABNORMAL UNIT INFORMATION

| ABNORMALITY TYPE | 411 OPERATING SVC: e1 | 412 OPERATING SVC: e2 | 413 OPERATING SVC: e3 | 414 OPERATING SVC: e4 | 415 OPERATING SVC: e5 | 416 OPERATING SVC: e6 | 417 OPERATING SVC: e7 | 418 OPERATING SVC: e8 TO e10 |
|---|---|---|---|---|---|---|---|---|
| STANDBY SVC: e1 | ·OPERATING SVC ·STANDBY SVC | ·OPERATING SVC ·STANDBY SVC | ·STANDBY SVC ·TARGET UNIT | ·STANDBY SVC ·TARGET UNIT | ·OPERATING SVC ·STANDBY SVC | ·STANDBY SVC ·TARGET UNIT | ·STANDBY SVC ·TARGET UNIT | WHEN ABNORMALITY OF e8 TO e10 OCCURS DO NOT DETERMINE TO BE ABNORMAL AND DETECT ABNORMALITY IN NEXT ACCESS |
| STANDBY SVC: e2 | ·OPERATING SVC ·STANDBY SVC | ·OPERATING SVC ·STANDBY SVC | ·STANDBY SVC ·TARGET UNIT | ·STANDBY SVC ·TARGET UNIT | ·OPERATING SVC ·STANDBY SVC | ·STANDBY SVC ·TARGET UNIT | ·STANDBY SVC ·TARGET UNIT | |
| STANDBY SVC: e3 | ·OPERATING SVC ·TARGET UNIT | ·OPERATING SVC ·TARGET UNIT | ·TARGET UNIT | ·STANDBY SVC ·TARGET UNIT | ·OPERATING SVC ·TARGET UNIT | ·STANDBY SVC ·TARGET UNIT | ·STANDBY SVC ·TARGET UNIT | |
| STANDBY SVC: e4 | ·OPERATING SVC ·TARGET UNIT | ·OPERATING SVC ·TARGET UNIT | ·STANDBY SVC ·TARGET UNIT | ·TARGET UNIT | ·OPERATING SVC ·TARGET UNIT | ·STANDBY SVC ·TARGET UNIT | ·STANDBY SVC ·TARGET UNIT | |
| STANDBY SVC: e5 | ·OPERATING SVC ·STANDBY SVC | ·OPERATING SVC ·STANDBY SVC | ·OPERATING SVC ·TARGET UNIT | ·OPERATING SVC ·TARGET UNIT | ·OPERATING SVC ·STANDBY SVC | ·STANDBY SVC ·TARGET UNIT | ·STANDBY SVC ·TARGET UNIT | |
| STANDBY SVC: e6 | ·OPERATING SVC ·TARGET UNIT | ·OPERATING SVC ·TARGET UNIT | ·OPERATING SVC ·TARGET UNIT | ·OPERATING SVC ·TARGET UNIT | ·OPERATING SVC ·TARGET UNIT | ·TARGET UNIT | ·OPERATING SVC ·TARGET UNIT | |
| STANDBY SVC: e7 | ·OPERATING SVC ·TARGET UNIT | ·OPERATING SVC ·TARGET UNIT | ·OPERATING SVC ·TARGET UNIT | ·OPERATING SVC ·TARGET UNIT | ·OPERATING SVC ·TARGET UNIT | ·OPERATING SVC ·TARGET UNIT | ·TARGET UNIT | |
| STANDBY SVC: e8 TO e10 | ·OPERATING SVC | ·OPERATING SVC | ·OPERATING SVC | ·OPERATING SVC | ·OPERATING SVC | ·OPERATING SVC | ·OPERATING SVC | |
| STANDBY SVC: NORMAL | ·OPERATING SVC (eu1) | ·OPERATING SVC | ·OPERATING SVC | ·OPERATING SVC | ·OPERATING SVC | ·OPERATING SVC | ·OPERATING SVC | |

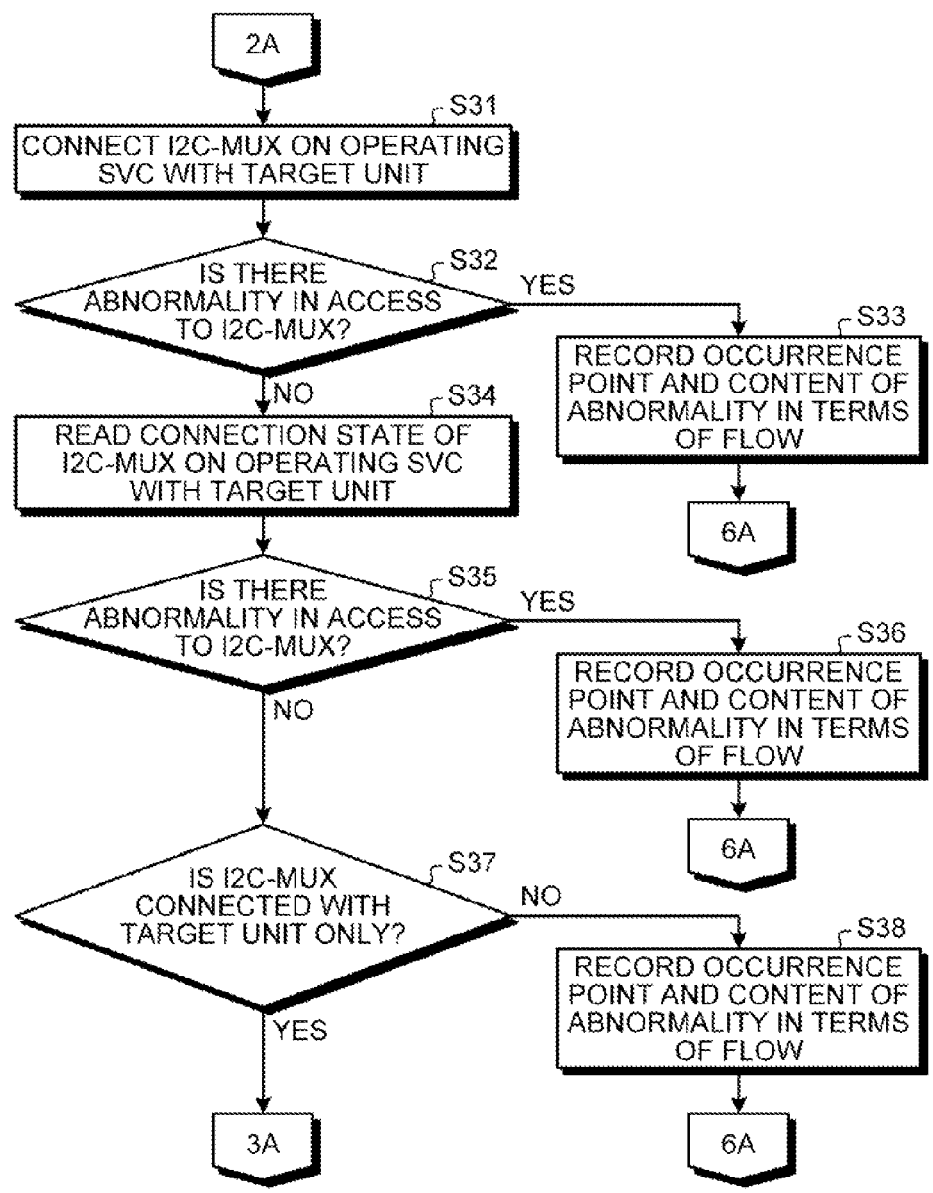

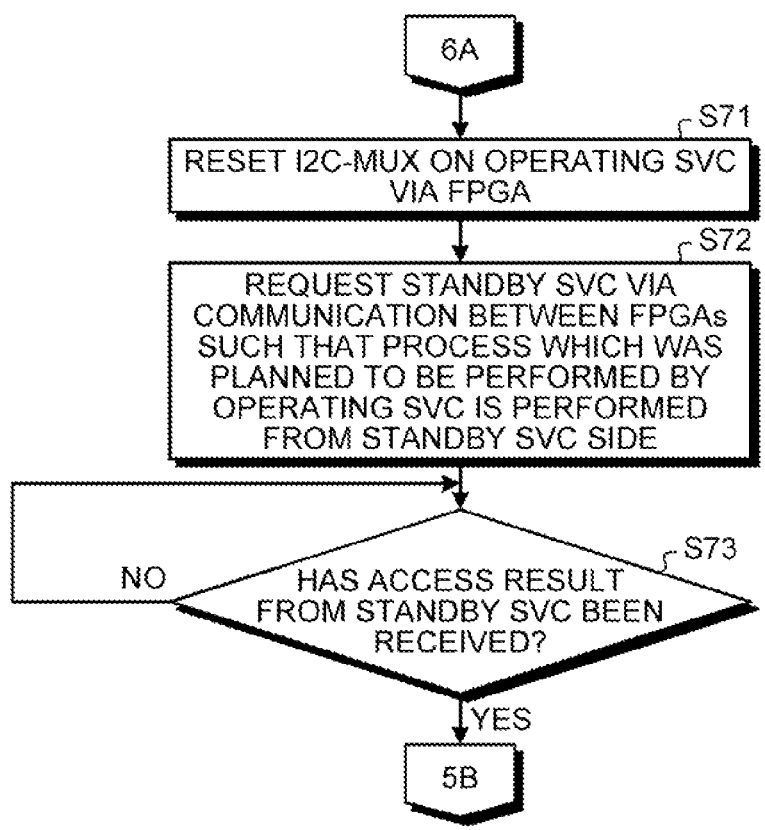

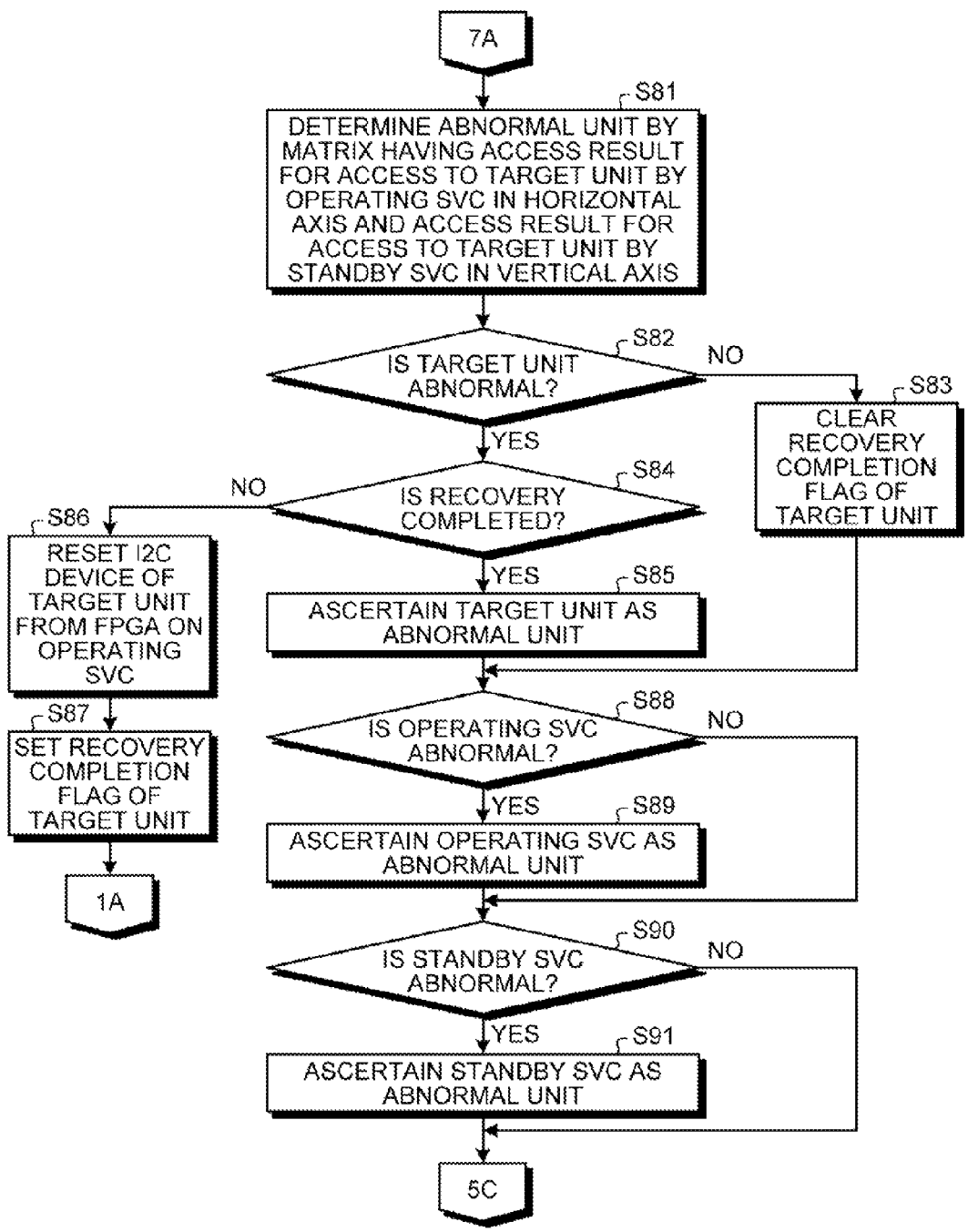

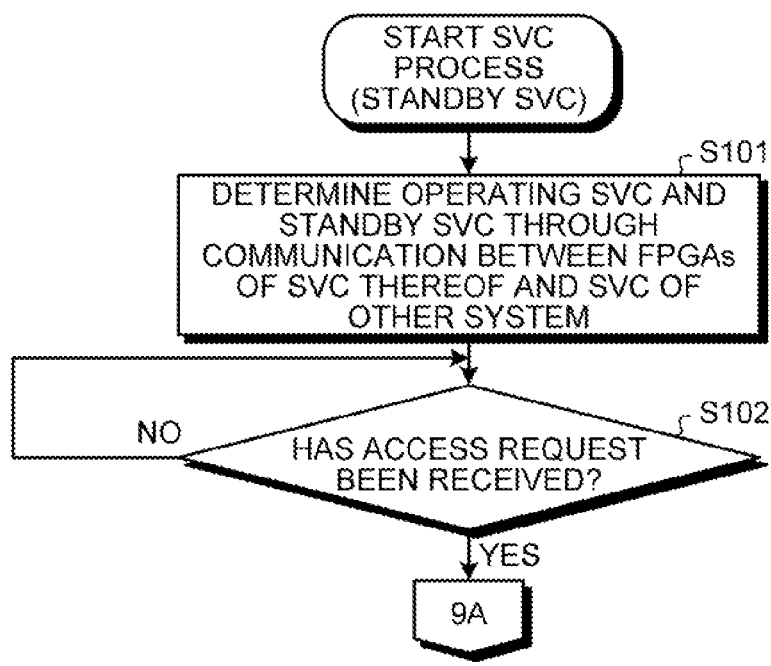

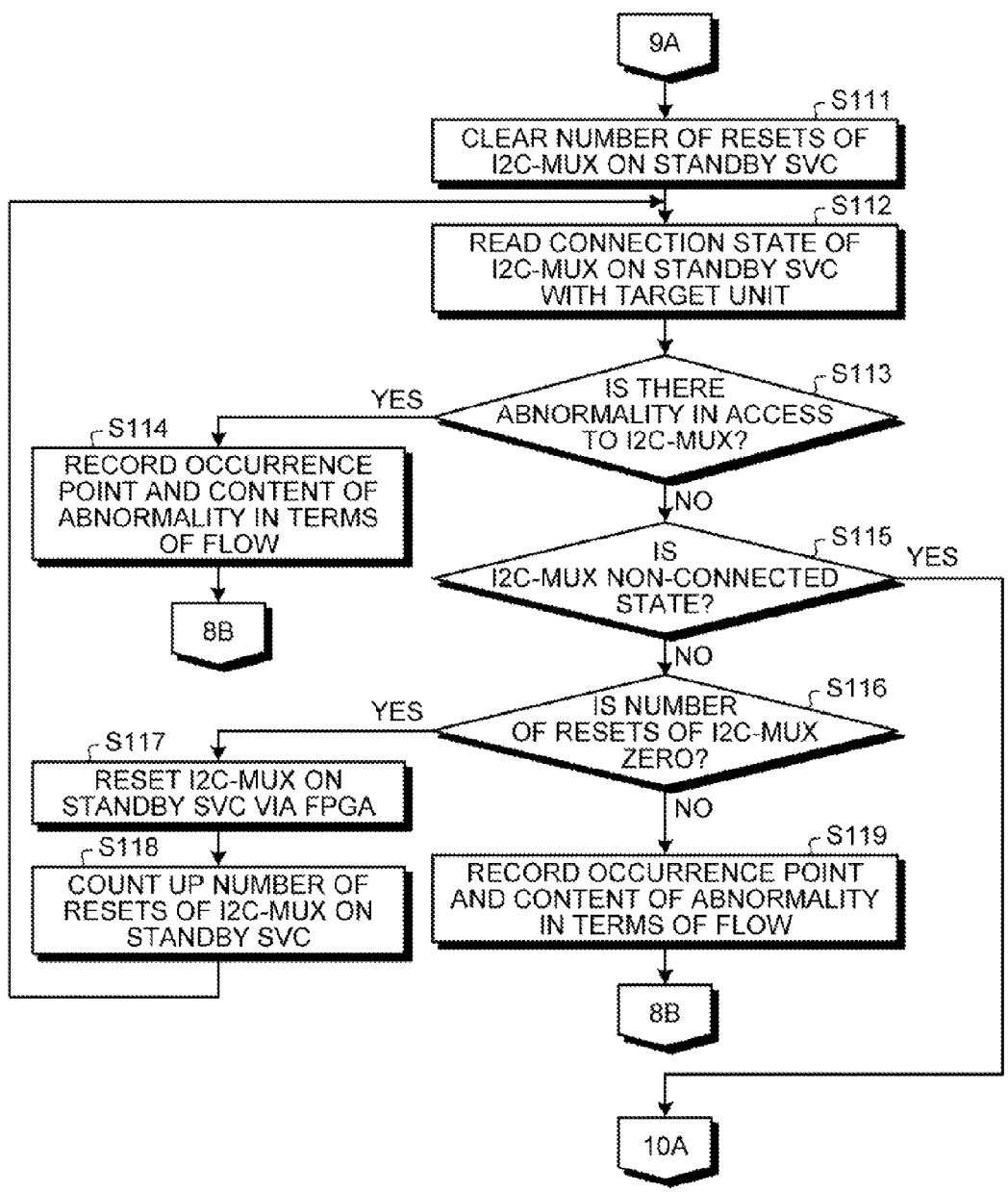

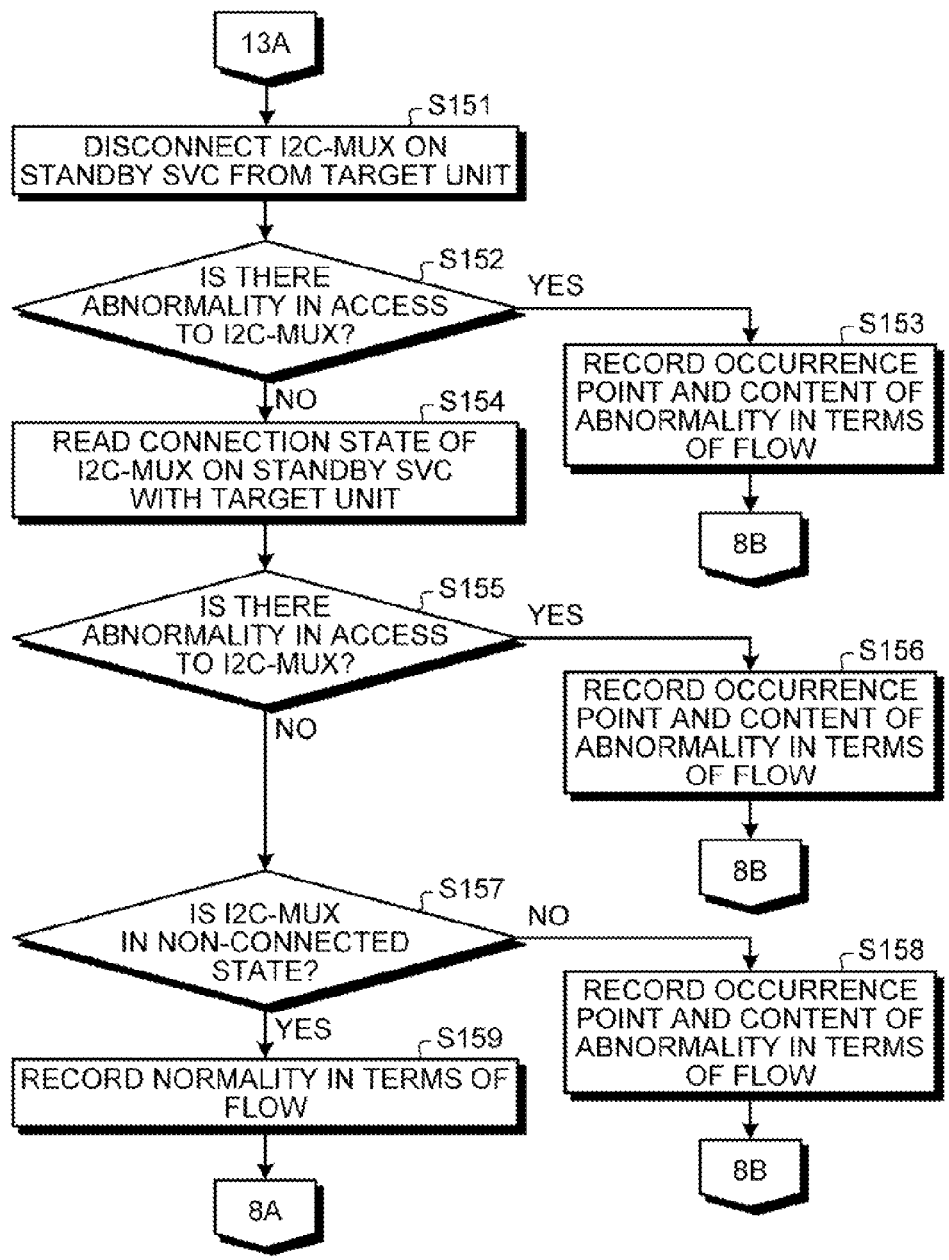

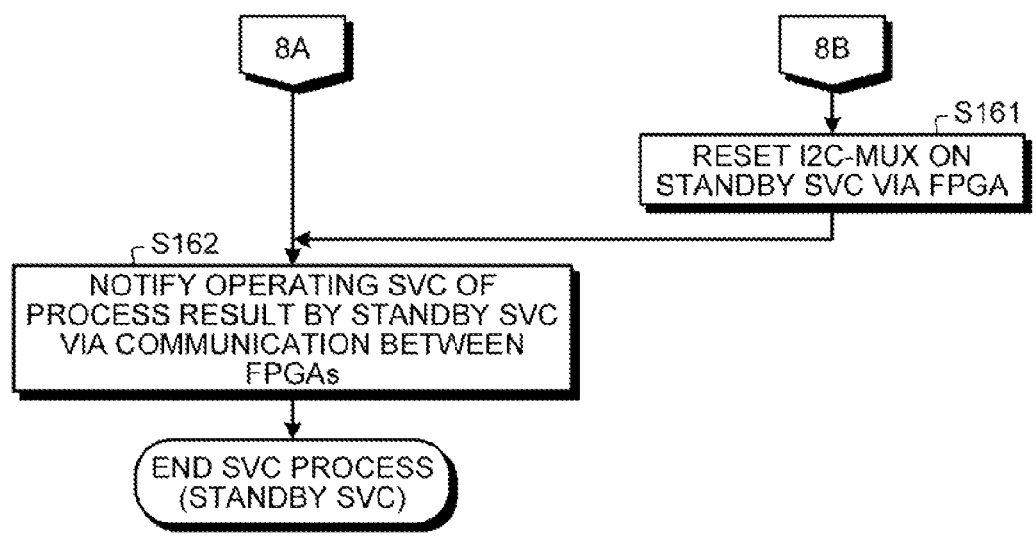

INFORMATION PROCESSING APPARATUS, CONTROL DEVICE, AND ABNORMAL UNIT DETERMINATION METHOD

CROSS-REFERENCE TO RELATED APPLICATION

This application is based upon and claims the benefit of priority of the prior Japanese Patent Application No. 2011-063404, filed on Mar. 22, 2011, the entire contents of which are incorporated herein by reference.

FIELD

The embodiment discussed herein is directed to, for example, an information processing apparatus.

BACKGROUND

An inter-integrated circuit (I2C) bus is a two-wire bidirectional serial bus and has a simple structure with two signal lines of a serial clock and serial data. Such a simple structure allows the I2C bus to be readily introduced.

When a plurality of I2C units are connected to the same I2C bus, a hang-up of any of the I2C units, for example, due to low stack which decreases a voltage level inside a signal line causes communications of the other I2C units to fail. In such a situation, a bus master unit connected to the I2C bus specifies and resets a hung-up bus slave unit based on the voltage of the serial data line of the I2C bus. Such a technique is disclosed in Japanese Laid-open Patent Publication No. 2010-055472, Japanese Laid-open Patent Publication No. 2005-004745, and Japanese Laid-open Patent Publication No. 2010-211810.

However, when an access abnormality occurs due to low stack in a bus master unit, for example, the conventional technique cannot determine whether the abnormality has occurred in a bus master unit side or an access destination of a bus slave unit side.

SUMMARY

According to an aspect of an embodiment of the invention, a method for determining an abnormal unit is executed by an information processing apparatus. The method includes determining whether or not there is an abnormal point in access to a slave unit by a first master unit that controls a plurality of slave units connected by a serial bus, requesting a second master unit having redundancy with the first master unit to access a specific slave unit when the abnormal point is determined to exist in access to the specific slave unit in the determining, and determining a unit having an abnormality by use of an access result relating to the abnormal point determined to have an abnormality in the determining and an access result indicating a result of the request made in the requesting.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 4 is a diagram illustrating an example of an abnormal unit determination matrix according to the embodiment;

FIG. 15B is a flowchart illustrating a procedure for determining an abnormality in connection with a target unit by the operating SVC;

FIG. 16 is a flowchart illustrating a procedure for making an access request to a standby SVC;

FIG. 17 is a flowchart illustrating a procedure for abnormal unit determination;

FIG. 18 is a flowchart illustrating a procedure for awaiting an access request by the standby SVC;

FIG. 19A is a flowchart illustrating a procedure for determining a status abnormality of an I2C-MUX by the standby SVC;

FIG. 19E is a flowchart illustrating a procedure for determining an abnormality in disconnection from the target unit by the standby SVC; and FIG. 20 is a flowchart illustrating a procedure for notifying the operating SVC of an access result.

DESCRIPTION OF EMBODIMENT

Preferred embodiments of the present invention will be explained with reference to accompanying drawings. In the following description, the embodiment is applied to an I2C bus device serving as the information processing apparatus including an I2C bus. However, the embodiment of the present invention is not limited thereto.

According to an embodiment, when there is an abnormality in any of I2C units connected to an I2C bus during operation of an I2C bus device, the I2C bus device can determine which I2C unit has an abnormality. In the I2C bus device, an I2C unit on a master side and an I2C unit on a slave side are connected one-to-one instead of one-to-many by the same I2C bus so that the unit having the abnormality is determined. In the I2C bus device, moreover, two I2C units are disposed on the master side and access the I2C unit on the slave side in a separate manner through different paths. Accordingly, the I2C bus device can determine the I2C unit having the abnormality by integration of each of the access results.

Figure 2A:
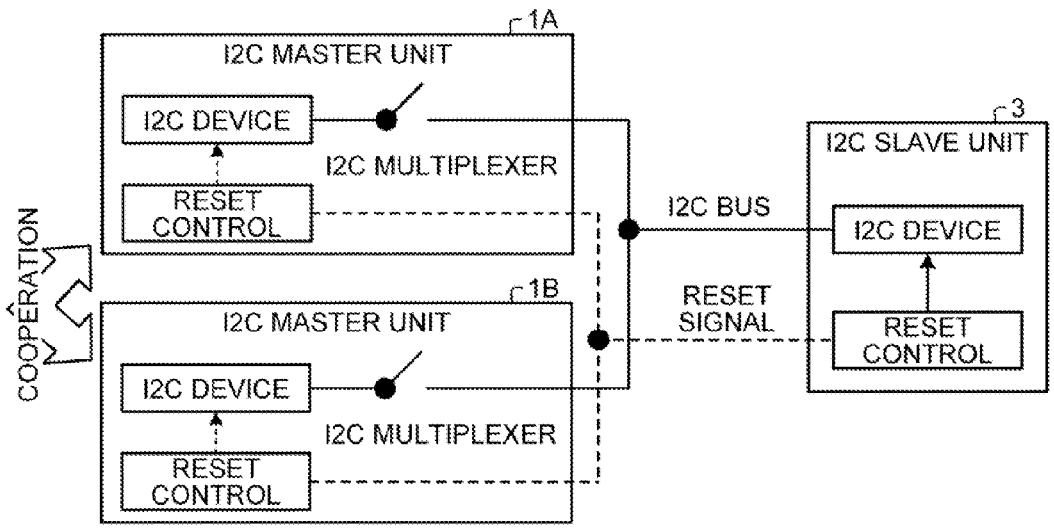
FIG. 2A is a diagram illustrating a connection of an I2C bus between units to determine an abnormal unit according to the embodiment.

FIG. 2A is a diagram illustrating a connection of an I2C bus between units to determine an abnormal unit according to the embodiment. As illustrated in FIG. 2A, I2C master units 1A and 1B are connected one-to-one with an I2C slave unit 3 by substantially the same I2C bus.

The I2C bus has paths from the I2C master units 1A and 1B to the I2C slave unit 3, and these paths are redundant. That is, the I2C master unit 1A is connected with the I2C slave unit 3 by the I2C bus through an I2C multiplexer mounted thereon. The I2C master unit 1B is connected with the I2C slave unit 3 through an I2C multiplexer mounted thereon by using a path which is different from that for the I2C master unit 1A. When the I2C master unit 1A is being connected to the I2C slave unit 3 through the I2C multiplexer thereof, the I2C master unit 1B is in a non-connected state by the I2C multiplexer thereof such that the I2C master unit 1B is not connected to the I2C slave unit 3. When the I2C master unit 1B is being connected to the I2C slave unit 3 through the I2C multiplexer thereof, on the other hand, the I2C master unit 1A is in a non-connected state by the I2C multiplexer thereof such that I2C master unit 1A is not connected to the I2C slave unit 3.

In the connections of the I2C master units 1A and 1B with the I2C slave unit 3, the I2C master unit 1A cooperates with the I2C master unit 1B in integration of two access results that are results of access thereof to the I2C slave unit 3, and then determines an abnormal I2C unit.

Figure 2B:
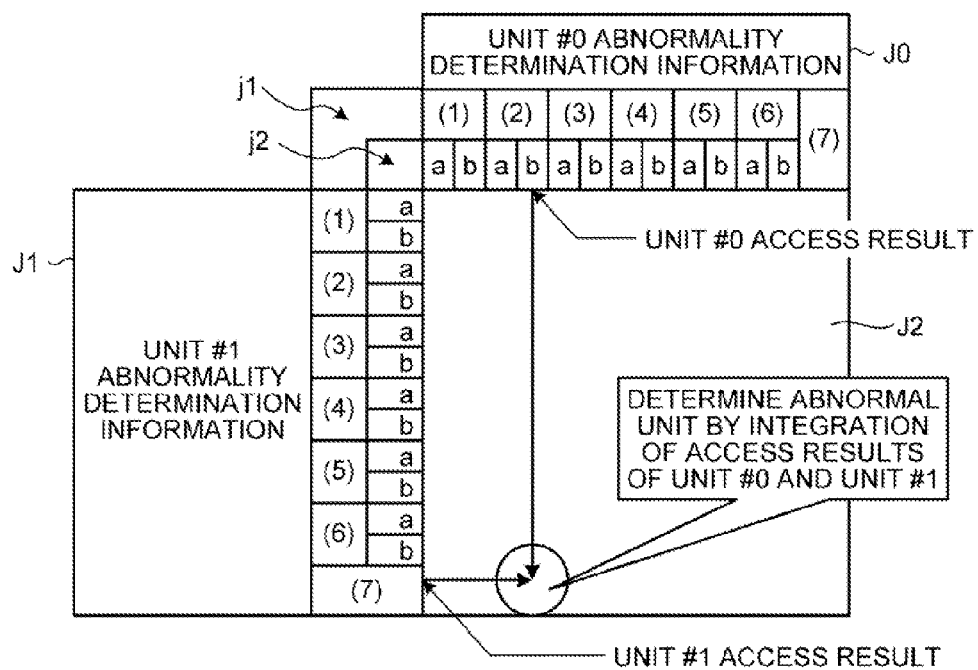
FIG. 2B is a diagram illustrating a method for determining the abnormal unit according to the embodiment.

FIG. 2B is a diagram illustrating a method for determining an abnormal unit according to the embodiment. As illustrated in FIG. 2B, a horizontal axis indicates abnormality determination information J0 of one of I2C master units, whereas a vertical axis indicates abnormality determination information J1 of the other I2C master unit. The abnormality determination information J0 and J1 each includes an access point j1 in which there is a possibility of an abnormality, and an abnormality content j2 which is a content of the abnormality in the access point j1. A matrix J2 indicates an abnormal unit group that is suspected based on the abnormality determination information of each of the two I2C master units. One of the I2C master units determines an abnormal I2C unit based on an intersection (integration) of an access result (abnormality occurrence point) thereof and an access result (abnormality occurrence point) of the other I2C master unit on the matrix J2.

Configuration of I2C Bus Device of Embodiment

Figure 1:
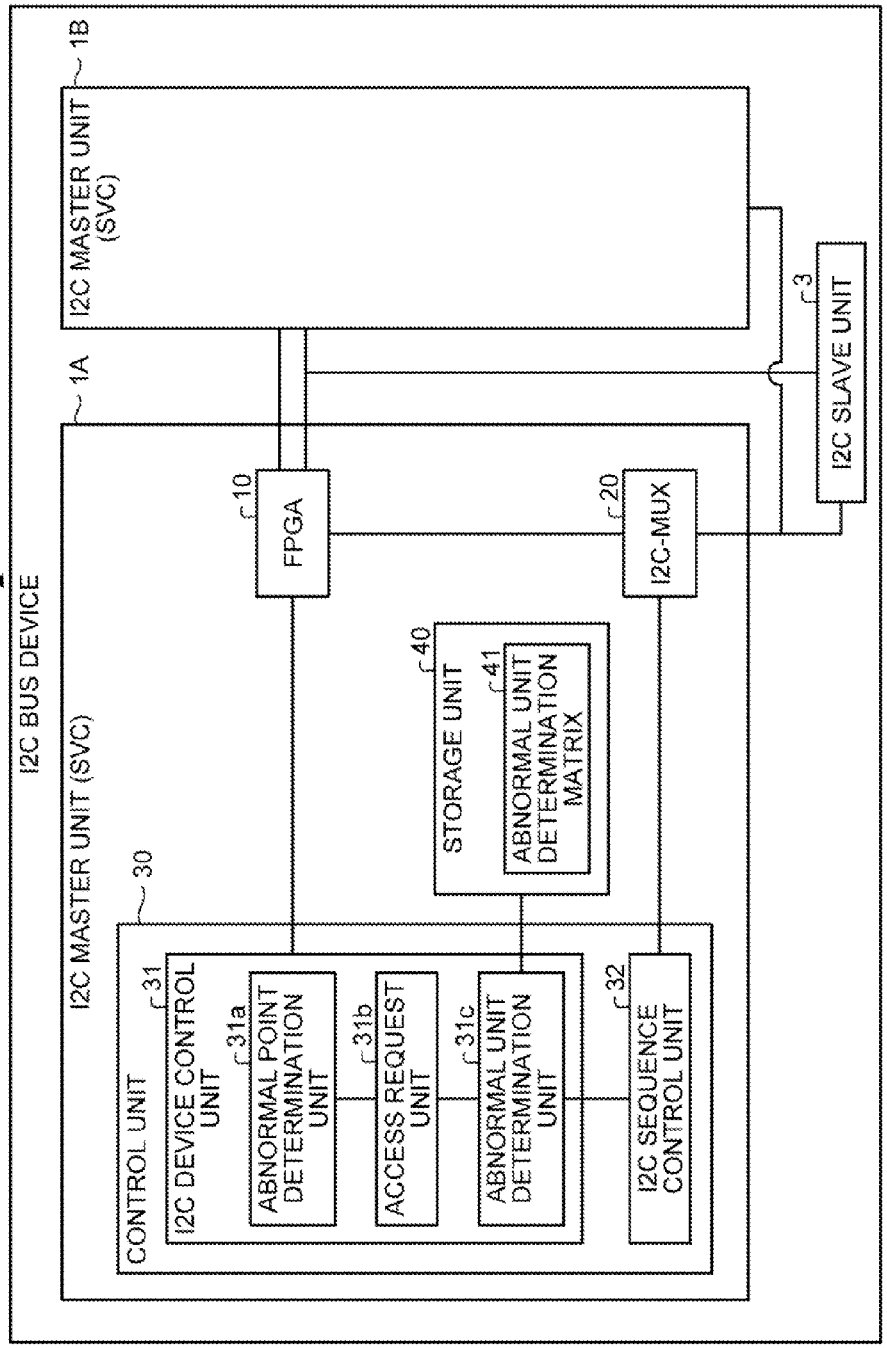
FIG. 1 is a functional block diagram illustrating a configuration of an I2C bus device according to an embodiment of the present invention.

Referring to FIG. 1, a configuration of an I2C bus device according to the embodiment is illustrated in a functional block diagram. An I2C bus device 9 includes the I2C master unit 1A, the I2C master unit 1B, and the I2C slave unit 3 as illustrated in FIG. 1. The I2C bus device 9 is, for example, a storage device that includes a storage device housing (DE) in which a plurality of hard disks is installed, and a housing (CE) in which units other than hard disk are installed. The I2C master unit 1A is called a service controller (SVC). The I2C master unit 1A controls and monitors a plurality of I2C slave units 3 that is connected through an I2C bus. The I2C master unit 1A has a redundant configuration with the I2C master unit 1B, and can serve as an operating system and a standby system. However, the I2C master unit 1A is hereinafter described as the operating system. The I2C master unit 1B is configured substantially similar to the I2C master unit 1A, and thus description thereof is omitted.

The I2C slave unit 3 is a unit serving as an I2C slave and is connected with each of the I2C master units 1A and 1B. The I2C slave unit 3 is, for example, a frontend router (FRT), a backend router (BRT), a power supply unit (PSU), or a battery backup unit (BBU). The FRT serves as a unit for providing a communication means between control modules (CM) for managing operation of the unit. The BRT serves as a unit for providing the CM with an access means for accessing a hard disk. The PSU serves as a unit for supplying the electric power to all units. The BBU serves as a unit for supplying the electric power to a specific unit in case of blackout. In FIG. 1, one I2C slave unit 3 is employed for the sake of convenience in description. Alternatively, a plurality of I2C slave units 3 may be employed.

The I2C master unit 1A is a unit serving as an I2C master, and includes a field programmable gate array (FPGA) 10, an I2C multiplexer (I2C-MUX) 20, a control unit 30, and a storage unit 40. The FPGA 10 is connected with the I2C master unit 1B, so that communication is performed between the FPGA 10 and an FPGA of the I2C master unit 1B. The FPGA 10 resets and initializes the I2C-MUX 20. The FPGA 10 also resets and initializes the I2C slave unit 3.

When there is a plurality of I2C slave units 3, the I2C-MUX 20 is connected with one of the plural I2C slave units 3 by an I2C bus, thereby accessing the connected I2C slave unit 3. The connection between the I2C-MUX 20 and the I2C slave unit 3 by the I2C bus is described later.

The control unit 30 includes an I2C device control unit 31 and an I2C sequence control unit 32. The control unit 30, for example, is an integrated circuit such as an FPGA and an application specific integrated circuit (ASIC), or an electronic circuit such as a central processing unit (CPU) and a micro processing unit (MPU).

The storage unit 40 includes an abnormal unit determination matrix 41. The storage unit 40, for example, is a semi-conductor memory device such as a random access memory (RAM) and a flash memory, or a storage device such as a hard disk and an optical disk. The abnormal unit determination matrix 41 stores therein a candidate unit that is to be determined to be abnormal by combination of access information of each of redundant I2C master units with respect to access information of an abnormal point in which there is the possibility of an abnormality in the I2C master unit. The abnormal unit determination matrix 41 is described later.

The I2C device control unit 31 controls devices of the I2C slave unit 3 and the I2C master unit 1B. The I2C device control unit 31 includes an abnormal point determination unit 31a, an access request unit 31b, and an abnormal unit determination unit 31c.

The abnormal point determination unit 31a determines whether or not there is any abnormal point in access to the I2C slave unit 3 connected to the unit thereof. For example, the abnormal point determination unit 31a arbitrates and determines an operating system and a standby system by using communication between the FPGA of the I2C master unit 1A and the FPGA of the I2C master unit 1B which is the other redundant system.

When the own unit is determined to be the operating system, the abnormal point determination unit 31a controls the I2C-MUX 20 through the I2C sequence control unit 32, so that the I2C-MUX 20 is connected with or disconnected from the I2C slave unit 3 (hereinafter called "target unit") which is to serve as an access target.

Moreover, when there is an abnormal point having an abnormality in access to the target unit, the abnormal point determination unit 31a resets the I2C-MUX 20 or an I2C device of the target unit through the FPGA 10 based on the abnormal point. Herein, an "I2C sequence abnormality" and an "I2C device abnormality" can be detected in the access to the target unit. The "I2C sequence abnormality" represents a case where an abnormality is detected by the I2C sequence control unit 32 described later. For example, such an I2C sequence abnormality is detected: when a start condition indicating a control signal used to acquire the right to use the bus or a stop condition indicating a control signal used to release the bus is not detected; when acknowledgment (ACK) notifying a normal end from the target unit is not detected; and when an overrun error is detected. On the other hand, the "I2C device abnormality" represents a case where an abnormality is detected by the abnormal point determination unit 31a. Such an abnormality is detected, for example, when an I2C device of the target unit does not operate as expected.

Moreover, the abnormal point determination unit 31a designates the I2C device of the target unit. The abnormal point determination unit 31a reads a register of the designated I2C device and writes to the register of the designated I2C device through the I2C sequence control unit 32. Alternatively, the abnormal point determination unit 31a may either read a register of the designated I2C device or write to the register of the designated I2C device through the I2C sequence control unit 32.

When the own unit is determined to be the standby system, the abnormal point determination unit 31a awaits an access request for access to the target unit, the access request being transmitted from the I2C master unit 1B serving as the operating system through communication between the FPGAs. Upon receipt of the access request for access to the target unit, the abnormal point determination unit 31a allows the access to the target unit, and then notifies of an access result to the I2C master unit 1B serving as the operating system through communication between the FPGAs.

The access request unit 31b requests the I2C master unit 1B on the standby system side to access the target unit when the abnormal point determination unit 31a determines that there is an abnormal point in the access to the same target unit.

The abnormal unit determination unit 31c determines an abnormal unit by a combination of an access result relating to the abnormal point determined by the abnormal point determination unit 31a and an access result indicating a result of the request made by the access request unit 31b. For example, the abnormal unit determination unit 31c determines an abnormal unit by use of a combination of each of the abnormality determination information stored in the abnormal unit determination matrix 41 for the I2C master units and a combination of each of the actual access results. The abnormality determination information includes information on a point in which there is a possibility of an abnormality and the content of the abnormality in the point. For example, the abnormality determination information includes information on a device abnormality and a sequence abnormality in access to the I2C-MUX. In addition, the abnormality determination information includes information on a sequence abnormality in connection with the target unit, and information on a sequence abnormality and a device abnormality in reading or writing subsequent to the connection with the target unit. The abnormality determination information is described in detail later.

The I2C sequence control unit 32 transmits various signals or various commands used for sequence of I2C to the target unit, and detect the signals or the commands. For example, the I2C sequence control unit 32 transmits a control signal of a start condition or a control signal of a stop condition to the target unit, and detects these signals. Moreover, the I2C sequence control unit 32 transmits ACK to the target unit, and detects the ACK. In addition, the I2C sequence control unit 32 transmits address data, register data or write data for a device of the target unit designated by the abnormal point determination unit 31a to the I2C bus with the applicable command. Then, the I2C sequence control unit 32 receives the register data corresponding to the command from the target unit and notifies the abnormal point determination unit 31a.

Moreover, the I2C sequence control unit 32 detects an abnormality in the sequence of I2C as "an I2C sequence abnormality".

Description of Abnormal Point Determination

Figure 3:
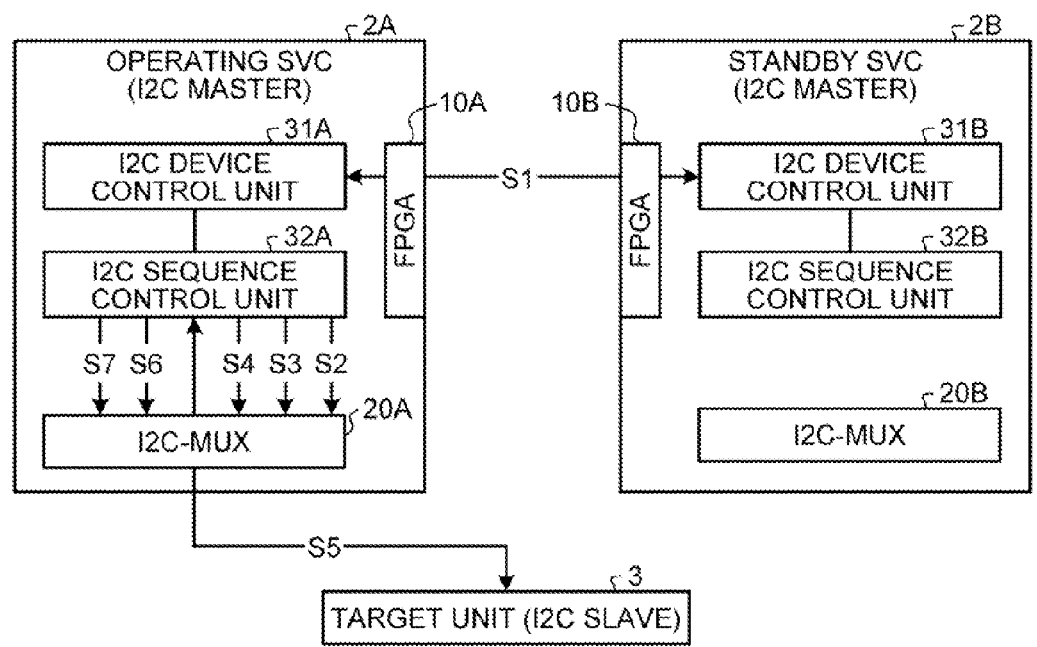
FIG. 3 is a diagram illustrating determination of an abnormal point according to the embodiment.

Referring to FIG. 3, a description is given of determination of an abnormal point by the abnormal point determination unit 31a according to the embodiment. In FIG. 3, assume that an operating SVC 2A corresponds to an I2C master unit serving as an operating system, and a standby SVC 2B corresponds to an I2C master unit serving as a standby system. As illustrated in FIG. 3, the operating SVC 2A is duplicated with the standby SVC 2B, and is connected with a target unit 3 by an I2C bus through an I2C-MUX 20A mounted thereon. The stand-by SVC 2B includes an I2C device control unit 31B, an I2C sequence control unit 32B and an I2C-MUX 20B, in a similar manner as the operating SVC 2A. A reference numeral with a double quotation mark found in the following description indicates an abnormality type.

The operating SVC 2A includes an I2C device control unit 31A that arbitrates and determines whether the operating SVC 2A is to serve as an operating system or a standby system through an FPGA 10A and an FPGA 10B of the standby SVC 2B (S1). Herein, assume that the I2C device control unit 31A determines that the operating SVC 2A serves as the operating system.

Subsequently, the operating SVC 2A serving as the operating system checks status of the I2C-MUX 20A through an I2C sequence control unit 32A, for example, by retrieving the status from a storage unit of the I2C-MUX 20A (S2). Herein, if the I2C sequence control unit 32A detects an abnormality in access to the I2C-MUX 20A, the I2C device control unit 31A determines that the abnormality is an I2C sequence abnormality "e1". If the I2C device control unit 31A detects an abnormality in which the I2C-MUX 20A is not in an expected status, the I2C device control unit 31A determines that the abnormality is a device abnormality "e2". The abnormality in which the I2C-MUX 20A is not in the expected status, for example, is a case where the I2C-MUX 20A has been already connected with the target unit. When the I2C device control unit 31A detects such an abnormality in the status of the I2C-MUX 20A, the I2C device control unit 31A disconnects the I2C-MUX 20A by resetting, requests the standby SVC 2B determined to serve as a standby system to access the target unit 3, and then awaits an access result.

Next, the operating SVC 2A connects the I2C-MUX 20A with the target unit 3 through the I2C sequence control unit 32A (S3). Herein, if the I2C device control unit 31A detects an abnormality in access to the I2C-MUX 20A, the I2C device control unit 31A determines that the abnormality is an I2C sequence abnormality "e3". When the I2C device control unit 31A detects an abnormality in connection with the target unit 3, the I2C device control unit 31A disconnects the I2C-MUX 20A by resetting, requests the standby SVC 2B determined to serve as the standby system to access the target unit 3, and then awaits an access result.

Subsequently, the operating SVC 2A checks a value of the resister of the I2C-MUX 20A through the I2C sequence control unit 32A. For example, when the value of the resister of the I2C-MUX 20A is updated to a predetermined value, the operating SVC 2A confirms that the I2C-MUX 20A has been connected with the target unit 3 (S4). Herein, if the I2C sequence control unit 32A detects an abnormality in access to the I2C-MUX 20A, the I2C device control unit 31A determines that the abnormality is an I2C sequence abnormality "e4". If the I2C device control unit 31A detects an abnormality in which the register of the I2C-MUX 20A is not in an expected state, the I2C device control unit 31A determines that the abnormality is an I2C device abnormality "e5". The abnormality in which the I2C-MUX 20A is not in the expected state, for example, is a case where the I2C-MUX 20A is not connected with the target unit 3 only. When the I2C device control unit 31A detects the abnormality in connection with the target unit 3, the I2C device control unit 31A disconnects the I2C-MUX 20A by resetting, requests the standby SVC 2B determined to serve as the standby system to access the target unit 3, and then awaits an access result.

Subsequently, the operating SVC 2A reads desired data from the target unit 3, or writes desired data to the target unit 3 through the I2C sequence control unit 32A (S5). Herein, if the I2C sequence control unit 32A detects an abnormality in access to the target unit 3, the I2C device control unit 31A determines that the abnormality is an I2C sequence abnormality "e6". If the I2C device control unit 31A detects an abnormality that is not an expected value, the I2C device control unit 31A determines that the abnormality is an I2C device abnormality "e7". The abnormality that is not the expected value, for example, is a case where a reading value from a device of the target unit 3 is an impossible value for the device, or a correct value is not written in a designated position in a device of the target unit 3. When the I2C device control unit 31A detects the abnormality in access to the target unit 3, the I2C device control unit 31A disconnects the I2C-MUX 20A by resetting, requests the standby SVC 2B determined to serve as the standby system to access the target unit 3, and then awaits an access result.

Moreover, the operating SVC 2A disconnects the I2C-MUX 20A from the target unit 3 through the I2C sequence control unit 32A (S6). Herein, if the I2C device control unit 31A detects an abnormality in access to the I2C-MUX 20A, the I2C device control unit 31A determines that the abnormality is an I2C sequence abnormality "e8". When the I2C device control unit 31A detects an abnormality in disconnection with the target unit 3, the I2C device control unit 31A disconnects the I2C-MUX 20A by resetting, requests the standby SVC 2B determined to serve as the standby system to access the target unit 3, and then awaits an access result.

Subsequently, the operating SVC 2A confirms that the I2C-MUX 20A has been disconnected from the target unit 3 by a register of the I2C-MUX 20A through I2C sequence control unit 32A (S7). Herein, if the I2C sequence control unit 32A detects an abnormality in access to the I2C-MUX 20A, the I2C device control unit 31A determines that the abnormality is an I2C sequence abnormality "e9". If the I2C device control unit 31A detects an abnormality in which the register of the I2C-MUX 20 is not in an expected state, the I2C device control unit 31A determines that the abnormality is an I2C device abnormality "e10". For example, the abnormality in which the register of the I2C-MUX 20 is not in the expected state is a case where the I2C-MUX 20A fails to be in a non-connected state with the target unit 3.

Example of Abnormal Unit Determination Matrix

Next, a description is given of an example of the abnormal unit determination matrix 41 with reference to FIG. 4. As illustrated in FIG. 4, the abnormal unit determination matrix 41 stores therein abnormality determination information 41A of an operating SVC in a horizontal axis and abnormality determination information 41B of a standby SVC in a vertical axis. The abnormality determination information 41A of the operating SVC includes a plurality of abnormality types (including normality) stored therein. The abnormality type contains a point in which there is a possibility of an abnormality and a content of the abnormality. The abnormality determination information 41B of the standby SVC includes a plurality of abnormality types stored therein as similar to the abnormality determination information 41A of the operating SVC.

Examples of abnormality types are now described with reference to FIG. 4. For example, the operating SVC abnormality type "e1" indicated by a reference numeral 411 represents a case where an I2C sequence abnormality is provided in a point in which the operating SVC checks the status of the I2C-MUX 20A. The operating SVC abnormality type "e2" indicated by a reference numeral 412 represents a case where an I2C device abnormality is provided in a point in which the operating SVC checks the status of the I2C-MUX 20A. The operating SVC abnormality type "e3" indicated by a reference numeral 413 represents a case where an I2C sequence abnormality is provided in a point in which the operating SVC connects the I2C-MUX 20A with the target unit 3. The operating SVC abnormality type "e4" indicated by a reference numeral 414 represents a case where an I2C sequence abnormality is provided in a point in which the operating SVC confirms that the I2C-MUX 20A has been connected with the target unit by a register of the I2C-MUX 20A. The operating SVC abnormality type "e5" indicated by a reference numeral 415 represents a case where an I2C device abnormality is provided in a point in which the operating SVC confirms that the I2C-MUX 20A has been connected with the target unit by a register of the I2C-MUX 20A. The operating SVC abnormality type "e6" indicated by a reference numeral 416 represents a case where an I2C sequence abnormality is provided in a point in which the operating SVC accesses the target unit 3. The operating SVC abnormality type "e7" indicated by a reference numeral 417 represents a case where an I2C device abnormality is provided in a point in which the operating SVC accesses the target unit 3. The operating SVC abnormality type "e8" indicated by a reference numeral 418 represents a case where an I2C sequence abnormality is provided in a point in which the operating SVC disconnects the target unit from the I2C-MUX. The operating SVC abnormality type "e9" represents a case where an I2C sequence abnormality is provided in a point in which the operating SVC confirms that the I2C-MUX 20A has been disconnected from the target unit by a register of the I2C-MUX 20A. The operating SVC abnormality type "e10" represents a case where an I2C device abnormality is provided in a point in which the operating SVC confirms that the I2C-MUX 20A has been disconnected from the target unit by a register of the I2C-MUX 20A. The abnormality types of the abnormality determination information 41B of the standby SVC are substantially the same as those of the abnormality determination information 41A of the operating SVC, and thus descriptions thereof are omitted.

Abnormality unit information 41C stores therein a candidate unit that can be identified as abnormal by a combination of the abnormality types in the operating SVC abnormality determination information 41A and the standby SVC abnormality determination information 41B. In a reference numeral "eu1" in the example of FIG. 4, an abnormal candidate unit that can be identified by a combination of the abnormality type "e1" of the operating SVC and the abnormality type "normal" of the standby SVC is stored as an "OPERATING SVC".

Specific Examples of Abnormal Unit Determination

Referring to FIGS. 5 to 8, a description is given of specific examples where there is an abnormal point in which there is an abnormality in access to the target unit 3 from the operating SVC 2A, and then an abnormal unit is determined based on the abnormal point.

Figure 5:
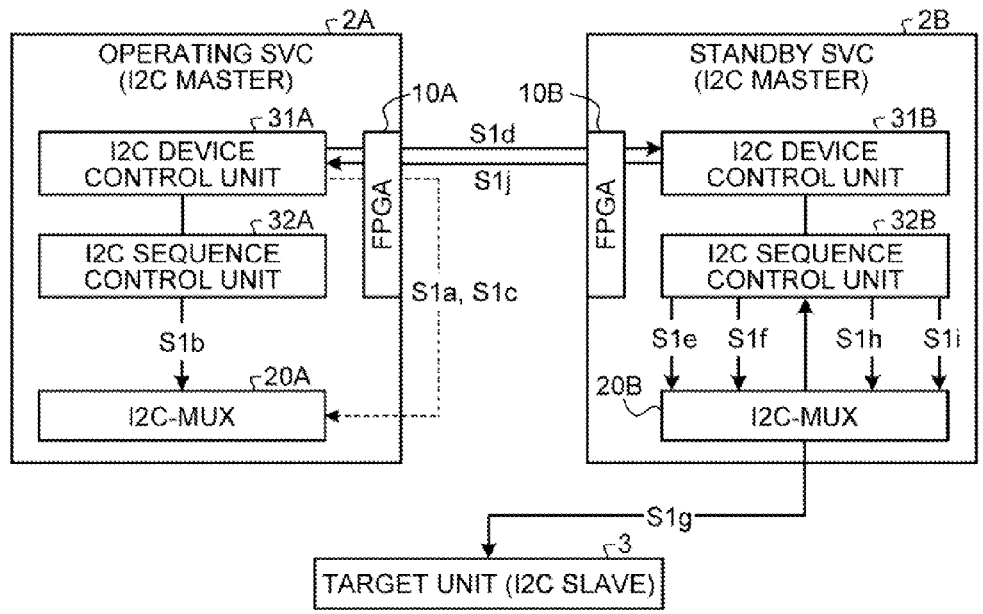
FIG. 5 is a diagram illustrating a specific example of abnormal unit determination according to the embodiment.

FIG. 5 is a diagram illustrating a specific example of abnormal unit determination according to the embodiment. With reference to FIG. 5, a description is given of a case where there is the I2C sequence abnormality ("e1") in a point in which the operating SVC 2A checks status of the I2C-MUX 20A. Accordingly, this specific example describes the operations to be performed after the I2C device control unit 31A first determines that an abnormality is the I2C sequence abnormality "e1".

Upon determining the I2C sequence abnormality "e1" at first, the I2C device control unit 31A resets the I2C-MUX 20A via FPGA (S1a). Subsequently, the I2C device control unit 31A reattempts to check the status of the I2C-MUX 20A (S1b). When the I2C sequence abnormality is not recovered until the number of reattempts reaches X, the I2C device control unit 31A abandons the connection from the operating SVC 2A. Herein, the I2C device control unit 31A stores an access result thereof as "e1" in the storage unit 40.

The I2C device control unit 31A resets the I2C-MUX 20A again via the FPGA such that operation in the standby system is not affected (S1c). Then, the I2C device control unit 31A requests the standby SVC 2B to check the connection to the target unit 3 by using communication between the PFGAs (S1d). That is, the I2C device control unit 31A requests access to the target unit 3.

Upon being requested to check the connection to the target unit 3, the I2C device control unit 31B of the standby SVC 2B checks the status of the I2C-MUX 20B, and then connects the I2C-MUX 20B with the target unit 3 (S1e). The I2C device control unit 31B confirms that the I2C-MUX 20B has been connected with the target unit 3 by a register of the I2C-MUX 20B (S1f). Moreover, the I2C device control unit 31B reads desired data from the target unit 3 or writes the desired data to the target unit 3 (S1g).

Subsequently, the I2C device control unit 31B disconnects the I2C-MUX 20B from the target unit 3 (S1h), and then confirms that the I2C-MUX 20B has been disconnected from the target unit 3 by the register of the I2C-MUX 20B (S1i). The I2C device control unit 31B notifies the operating SVC 2A of a result of the access to the target unit 3 by using communication between the FPGAs (S1j). Herein, the I2C device control unit 31B notifies the access result thereof as "normal".

The I2C device control unit 31A receives the result of access to the target unit 3 from the standby SVC 2B. The I2C device control unit 31A determines an abnormal unit from the access result of the operating SVC 2A and the access result of the standby SVC 2B based on the abnormal unit determination matrix 41. Herein, the access result of the operating SVC 2A is "e1", and the access result of the standby SVC 2B is "normal", so that the I2C device control unit 31A determines that the abnormal unit is the "operating SVC" based on the abnormal unit determination matrix 41 (see FIG. 4).

Figure 6:
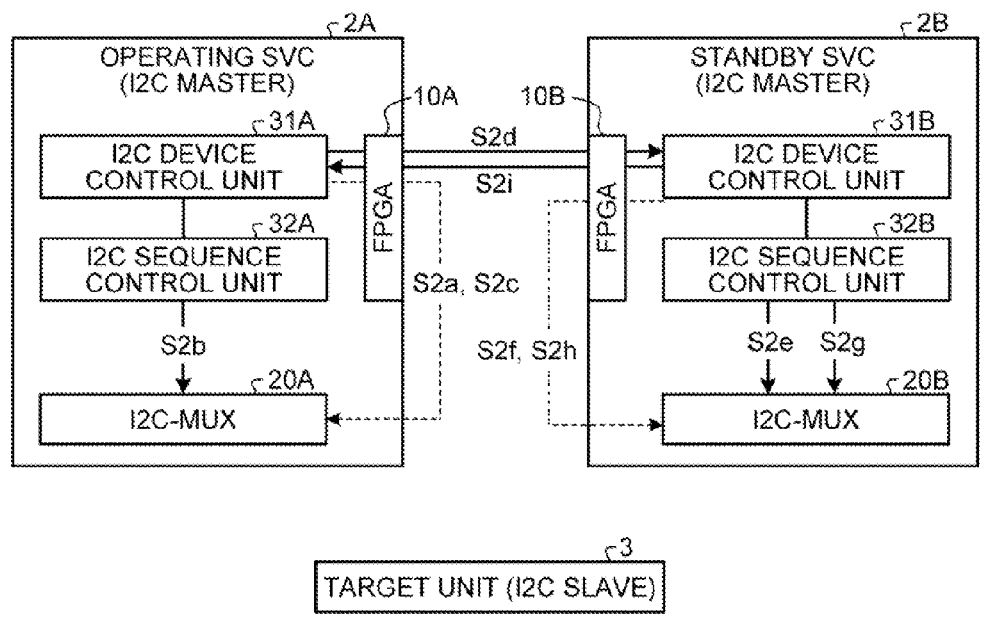
FIG. 6 is a diagram illustrating another specific example of the abnormal unit determination according to the embodiment.

FIG. 6 is a diagram illustrating another specific example of the abnormal unit determination according to the embodiment. With reference to FIG. 6, a description is given of a case where there is an I2C sequence abnormality ("e1") in points where the operating SVC 2A and the standby SVC 2B check status of the respective I2C-MUXs 20. Thus, this specific example describes the operations to be performed after the I2C device control unit 31A of the operating SVC 2A first determines that an abnormality is the I2C sequence abnormality "e1".

Upon determining the I2C sequence abnormality "e1" at first, the I2C device control unit 31A resets the I2C-MUX 20A via FPGA (S2a). Then, the I2C device control unit 31A reattempts to check status of the I2C-MUX 20A (S2b). When the I2C sequence abnormality is not recovered until the number of reattempts reaches X, the I2C device control unit 31A abandons the connection from the operating SVC 2A. Herein, the I2C device control unit 31A stores an access result thereof as "e1" in the storage unit 40.

The I2C device control unit 31A resets the I2C-MUX 20A again via the FPGA such that operation in the standby system is not affected (S2c). Then, the I2C device control unit 31A requests the standby SVC 2B to check the connection to the target unit 3 by using communication between the FPGAs (S2d). That is, the I2C device control unit 31A requests access to the target unit 3.

Upon being requested to check the connection to the target unit 3, the I2C device control unit 31B of the standby SVC 2B checks the status of the I2C-MUX 20B (S2e). However, since the I2C device control unit 31B detects an abnormality in access to the I2C-MUX 20B, the abnormality is determined as the I2C sequence abnormality "e1". Accordingly, the I2C device control unit 31B resets the I2C-MUX 20B via FPGA (S2f). Then, the I2C device control unit 31B reattempts to check the status of the I2C-MUX 20B (S2g). When the abnormality is not recovered until the number of reattempts reaches X, the I2C device control unit 31B abandons the connection from the standby SVC 2B. Herein, the I2C device control unit 31B stores an access result thereof as "e1" in the storage unit 40 of the standby SVC.

The I2C device control unit 31B resets the I2C-MUX 20B again via the FPGA such that operation in the operating system is not affected (S2h). Subsequently, the I2C device control unit 31B notifies the operating SVC 2A of the result of access to the target unit 3 by using communication between the FPGAs (S2i). Herein, the I2C device control unit 31B notifies the access result thereof as "e1".

The I2C device control unit 31A of the operating SVC 2A receives the result of access to the target unit 3 from the standby SVC 2B. Then, the I2C device control unit 31A determines an abnormal unit from the access result of the operating SVC 2A and the access result of the standby SVC 2B based on the abnormal unit determination matrix 41. Herein, the access result of the operating SVC 2A is "e1", and the access result of the standby SVC 2B is "e1", so that the I2C device control unit 31A determines that the abnormal units are "the operating SVC and the standby SVC" based on the abnormal unit determination matrix 41. That is, when the access result is "e1", an abnormality is detected in access to the I2C-MUX 20 while the access to the target unit 3 is not allowed. Therefore, the abnormal units are determined to be "the operating SVC and the standby SVC".

Figure 7:
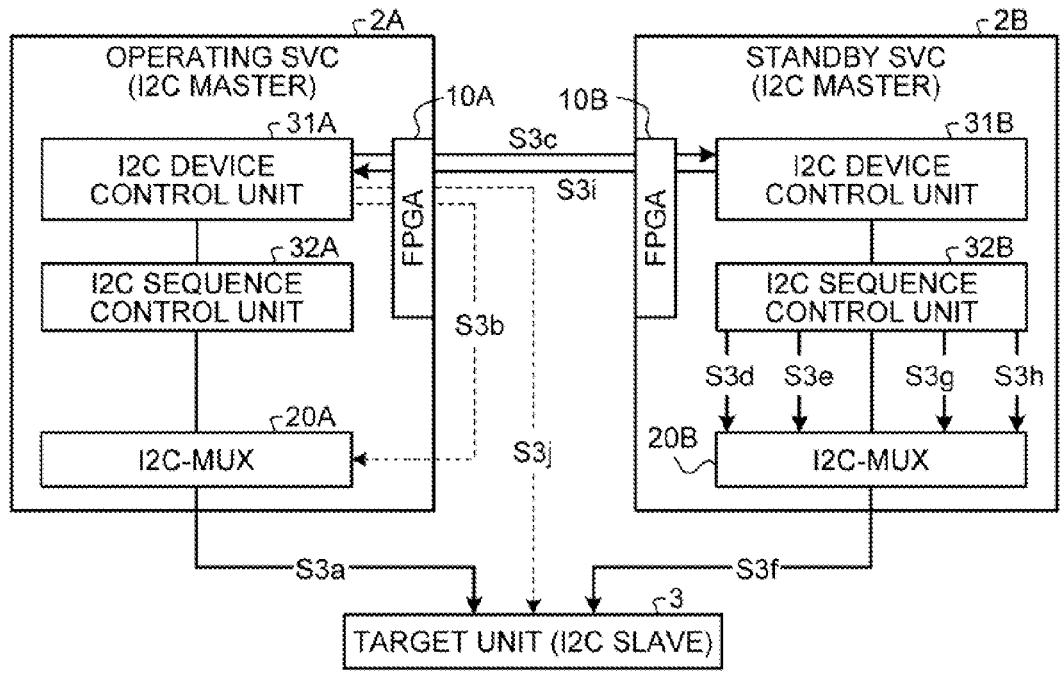
FIG. 7 is a diagram illustrating still another specific example of the abnormal unit determination according to the embodiment.

FIG. 7 is a diagram illustrating still another specific example of the abnormal unit determination according to the embodiment. With reference to FIG. 7, a description is given of a case where there is an I2C device abnormality ("e7") in points where the operating SVC 2A and the standby SVC 2B read desired data from the target unit 3. Accordingly, this specific example describes the operations to be performed after the I2C device control unit 31A first determines that an abnormality is the I2C device abnormality "e7".

Upon determining the I2C device abnormality "e7" at first, the I2C device control unit 31A reattempts operation of reading desired data from the target unit 3 (S3a). When the abnormality is not recovered until the number of reattempts reaches X, the I2C device control unit 31A abandons the connection from the operating SVC 2A and resets the I2C-MUX 20A via FPGA (S3b). Thus, the I2C device control unit 31A forces to disconnect the connection with the target unit 3, and then stores an access result thereof as "e7" in the storage unit 40. The I2C device control unit 31A requests the standby SVC 2B to check the connection to the target unit 3 by using communication between FPGAs (S3c). That is, the I2C device control unit 31A requests access to the target unit 3.

Upon being requested to check the connection to the target unit 3, the I2C device control unit 31B of the standby SVC 2B connects the I2C-MUX 20B with the target unit 3 (S3d). Subsequently, the I2C device control unit 31B confirms that the I2C-MUX 20B has been connected with the target unit 3 by a register of the I2C-MUX 20B (S3e).

Then, the I2C device control unit 31B reads the desired data from the target unit 3 (S3f). However, since the I2C device control unit 31B fails to read an expected value, the abnormality is determined as the I2C device abnormality "e7". Then, the I2C device control unit 31B reattempts to read the desired data from the target unit 3 until the number of reattempts reaches X. When the recovery is not made in spite of the X number of reattempts, the I2C device control unit 31B abandons the connection from the standby SVC 2B.

The I2C device control unit 31B resets the I2C-MUX 20B via the FPGA, and then disconnects the I2C-MUX 20B from the target unit 3 (S3g). Moreover, the I2C device control unit 31B confirms that the I2C-MUX 20B has been disconnected from the target unit 3 by a register of the I2C-MUX 20B (S3h).

Then, the I2C device control unit 31B notifies the operating SVC 2A of the result of access to the target unit 3 by using communication with the FPGAs (S3i). Herein, the I2C device control unit 31B notifies the access result thereof as "e7".

The I2C device control unit 31A of the operating SVC 2A receives the result of access to the target unit 3 from the standby SVC 2B. Subsequently, the I2C device control unit 31A determines the abnormal unit from the access result of the operating SVC 2A and the access result of the standby SVC 2B based on the abnormal unit determination matrix 41. Herein, the access result of the operating SVC 2A is "e7" and the access result of the standby SVC 2B is "e7", so that the I2C device control unit 31A determines that the abnormal unit is "the target unit" based on the abnormal unit determination matrix 41. In such a case, the I2C device control unit 31A resets the target unit 3 by the FPGA (S3j). Since the I2C-MUX 20A is disconnected, the I2C device control unit 31A checks a state of the I2C-MUX 20A, allows connection of the I2C-MUX 20A, and then re-executes from the operation of S3a. When the I2C device control unit 31A determines that the abnormal unit is "the target unit" again even after re-execution from the operation of S3a, the abnormal unit is ascertained as "the target unit".

In the operation of S3f, when the I2C device control unit 31B reads an expected value in the reattempt at reading the desired data from the target unit 3, the I2C device control unit 31B notifies the operating SVC 2A of the access result of the standby SVC 2B as "normal". In such a case, the I2C device control unit 31A determines that the abnormal unit is "the operating SVC".

Figure 8:
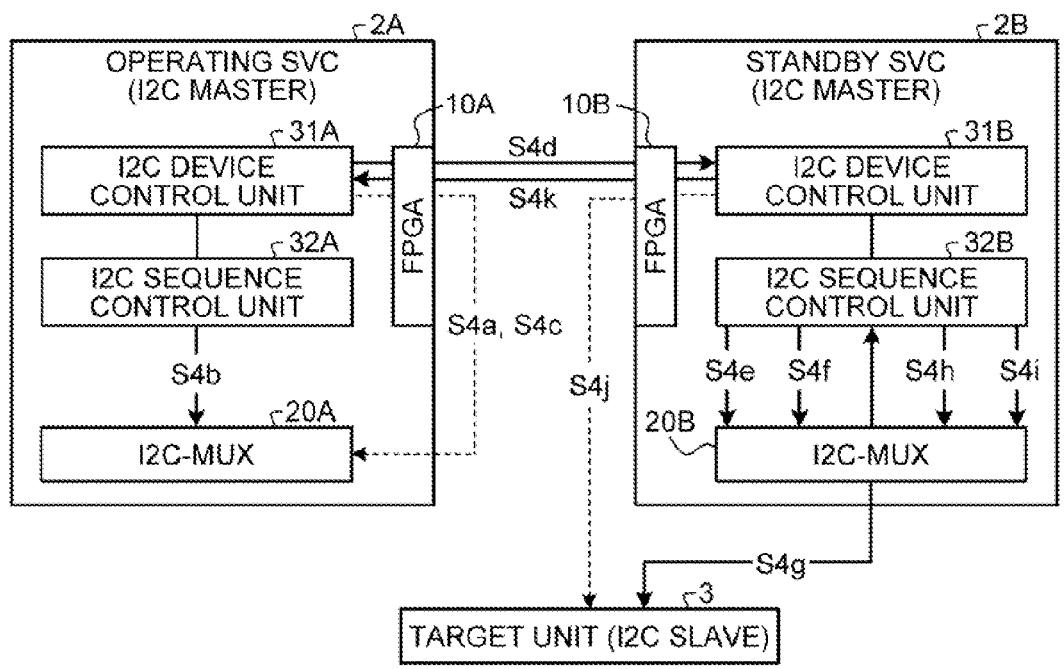
FIG. 8 is a diagram illustrating yet another specific example of the abnormal unit determination according to the embodiment.

FIG. 8 is yet another specific example of the abnormal unit determination according to the embodiment. With reference to FIG. 8, a description is given of a case where there is an I2C sequence abnormality ("e1") in a point in which the operating SVC 2A checks status of the I2C-MUX 20A and there is an I2C device abnormality ("e7") in a point in which the standby SVC 2B accesses the target unit 3. Accordingly, this specific example describes the operations to be performed after the I2C device control unit 31A first determines that an abnormality is the I2C sequence abnormality "e1".

Upon determining the I2C sequence abnormality "e1" at first, the I2C device control unit 31A resets the I2C-MUX 20A via FPGA (S4a). Then, the I2C device control unit 31A reattempts to check status of the I2C-MUX 20A (S4b). When the abnormality is not recovered until the number of reattempts reaches X, the I2C device control unit 31A abandons the connection from the operating SVC 2A. Herein, the I2C device control unit 31A stores an access result thereof as "e1" in the storage unit 40.

The I2C device control unit 31A resets the I2C-MUX 20A again via the FPGA such that operation in the standby system is not affected (S4c). Then, the I2C device control unit 31A requests the standby SVC 2B to check the connection to the target unit 3 by using communication between the PFGAs (S4d). That is, the I2C device control unit 31A requests access to the target unit 3.

Upon being requested to check the connection to the target unit 3, the I2C device control unit 31B of the standby SVC 2B connects the I2C-MUX 20B with the target unit 3 (S4e). Subsequently, the I2C device control unit 31B confirms that the I2C-MUX 20B has been connected to the target unit 3 by a register of the I2C-MUX 20B (S4f).

Then, the I2C device control unit 31B reads desired data from the target unit 3 (S4g). However, since the I2C device control unit 31B fails to read the expected value, the abnormality is determined as the I2C device abnormality "e7". Then, the I2C device control unit 31B reattempts to read the desired data from the target unit 3. When the recovery is not made until the number of reattempts reaches X, the I2C device control unit 31B abandons the connection from the standby SVC 2B.

The I2C device control unit 31B resets the I2C-MUX 20B through the FPGA, and then disconnects the I2C-MUX 20B from the target unit 3 (S4h). Moreover, the I2C device control unit 31B confirms that the I2C-MUX 20B has been disconnected from the target unit 3 by a register of the I2C-MUX 20B (S4i). Alternatively, the I2C device control unit 31B may reset the target unit 3 through the FPGA 10B (S4j) and reattempt the operations from the connection with the target unit 3 (S4e) when an abnormality in the operating SVC 2A has been determined at the time of receiving the request for connection checking from the operating SVC 2A.

The I2C device control unit 31B notifies the operating SVC 2A of the result of access to the target unit 3 by using communication between FPGAs (S4k). Herein, the I2C device control unit 31B notifies the access result thereof as "e7".

The I2C device control unit 31A of the operating SVC 2A receives the access result of access to the target unit 3 from the standby SVC 2B. The I2C device control unit 31A determines the abnormal unit from the access result of the operating SVC 2A and the access result of the standby SVC 2B based on the abnormal unit determination matrix 41. Herein, since the access result of the operating SVC 2A is "e1" and the access result of the standby SVC 2B is "e7", the I2C device control unit 31A determines that the abnormal units are "the operating SVC, and the target unit" based on the abnormal unit determination matrix 41.

After the operation of S4j, if the I2C device control unit 31B can read the expected value in the reattempt at reading the desired data from the target unit 3, the I2C device control unit 31B notifies the operating SVC 2A of the access result of the standby SVC 2B as "normal". In such a case, the I2C device control unit 31A determines that the abnormal unit is "the operating SVC".

I2C Bus Device for Execution of Abnormal Unit Determination

Figure 9:
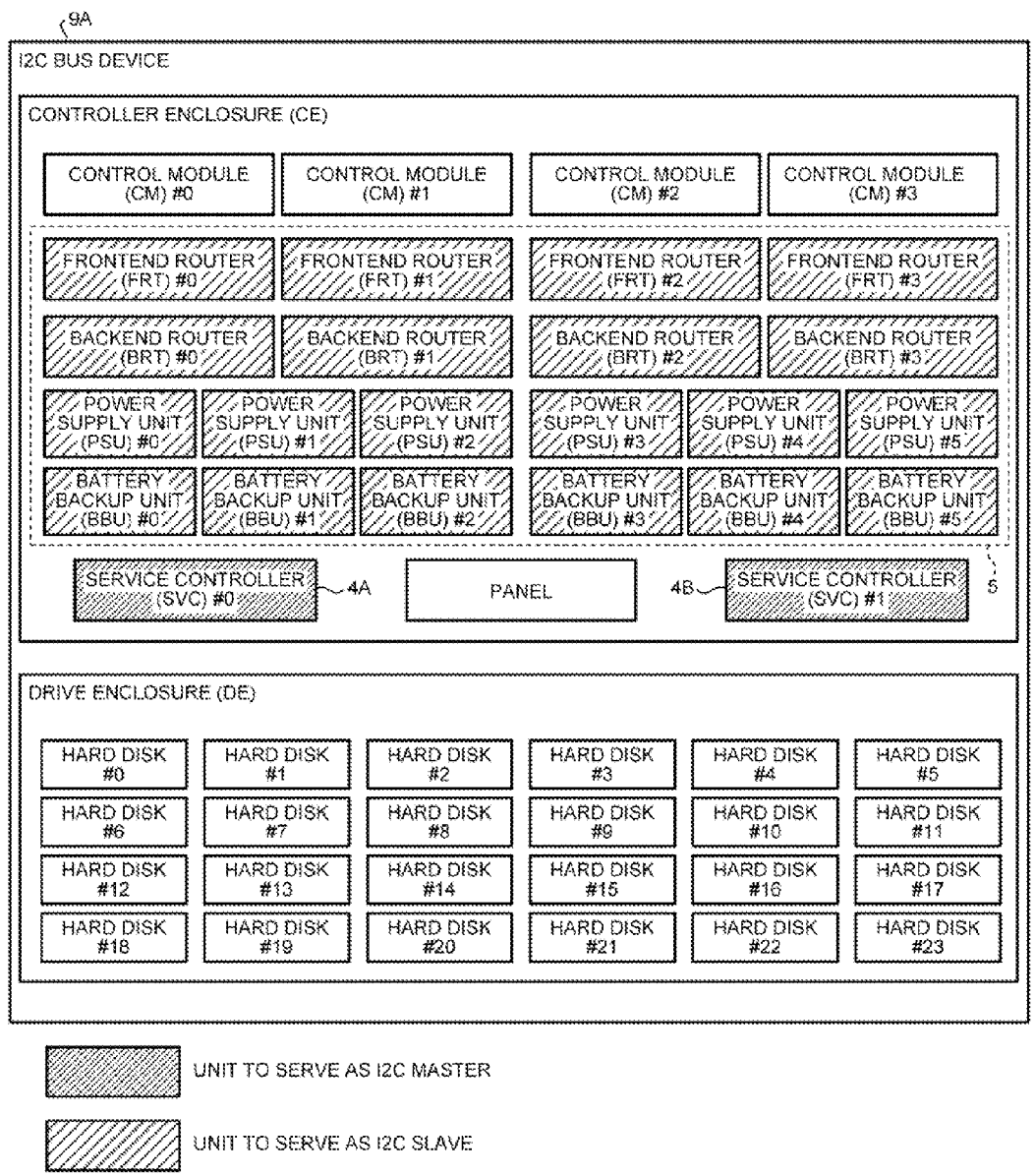
FIG. 9 is a diagram illustrating an example of the I2C bus device for the abnormal unit determination according to the embodiment.

Now, a description is given of an I2C bus device for executing abnormal unit determination with reference to FIG. 9 that illustrates an example of the I2C bus device according to the embodiment. As illustrated in FIG. 9, an I2C bus device 9A includes a device enclosure (DE) serving as a housing in which hard disks are enclosed; and a controller enclosure (CE) serving as a housing in which units other than the hard disk are enclosed. The DE includes a plurality of hard disks enclosed therein. The CE includes therein: a control module (CM) serving as a unit for managing unit operation; a frontend router (FRT) serving as a unit for providing a communication means between the CMs; and a backend router (BRT) serving as a unit for providing the CM with an access means to a hard disk. The CE also includes therein: a power supply unit (PSU) serving as a unit for supplying the electric power to all the units enclosed therein; and a battery backup unit (BBU) serving as a unit for supplying the electric power to a specific unit in case of black out. In addition, the CE includes therein: a panel serving as a unit for allowing a user to turn on and off the power supply to the I2C bus device; and a service controller (SVC) serving as a unit for controlling and monitoring the I2C bus device. A SVC 4A of FIG. 9 corresponds to the I2C master unit 1A of FIG. 1, and a SVC 4B of FIG. 9 corresponds to the I2C master unit 1B of FIG. 1. The FRT, BRT, PSU, and BBC indicated by a reference numeral 5 of FIG. 9 correspond to the I2C slave unit (target unit) 3 of FIG. 1.

Entire Configuration of Hardware for Execution of Abnormal Unit Determination

Figure 10:
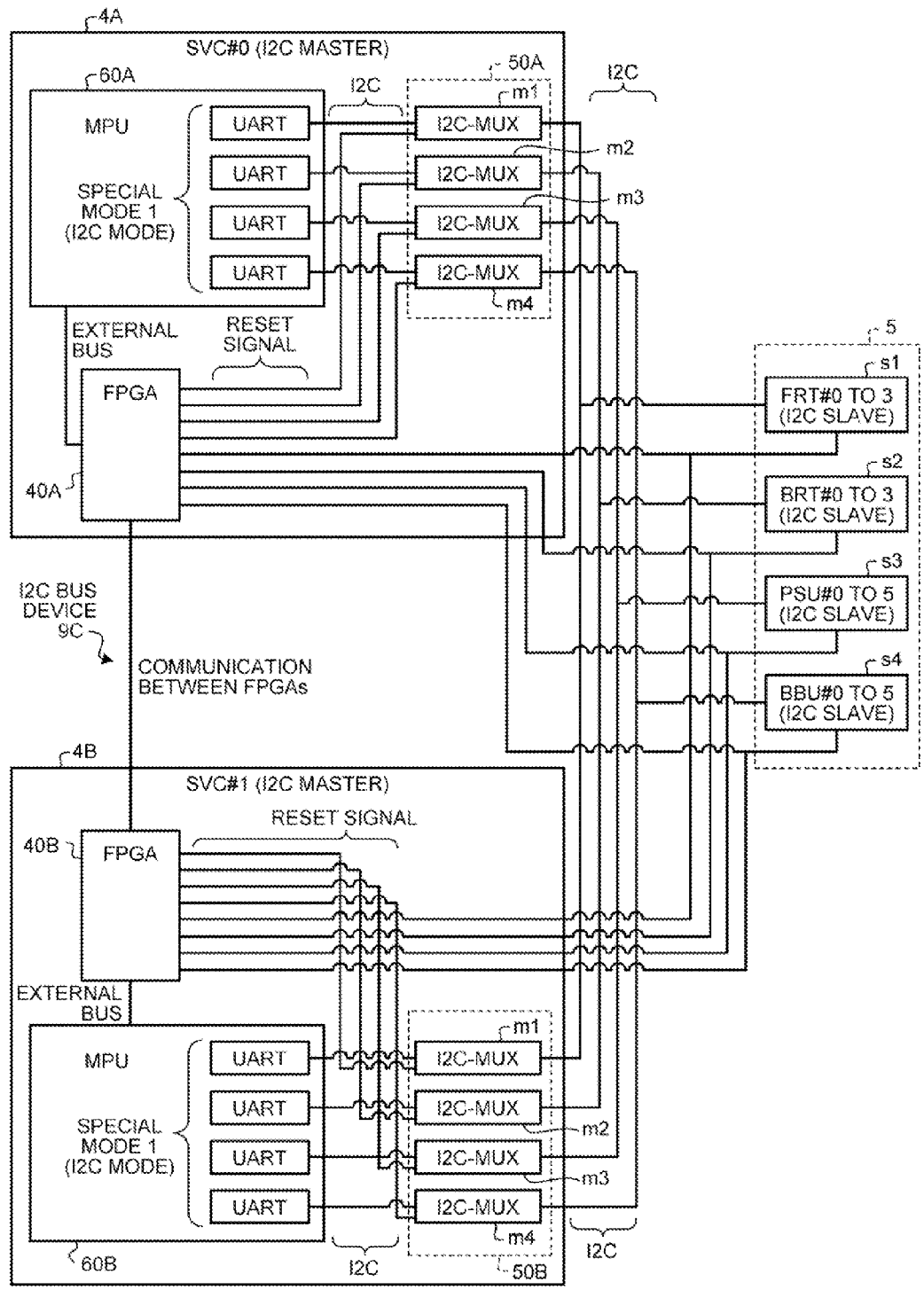
FIG. 10 is a diagram illustrating an example of an entire configuration of hardware for the abnormal unit determination according to the embodiment.

Referring to FIG. 10, a description is given of an entire configuration of hardware for executing abnormal unit determination according to the embodiment. FIG. 10 illustrates an I2C bus device 9C. As illustrated in FIG. 10, the SVC 4A includes an FPGA 40A, an I2C-MUX 50A, and a MPU 60A. The SVC 4A has a redundant configuration with the SVC 4B, which includes an FPGA 40B, an I2C-MUX 50B, and a MPU 60B. The SVC 4A and the SVC 4B are connected through the respective FPGAs 40A and 40B. The SVC 4A is connected with a target unit 5 by an I2C bus through the I2C-MUX 50A.

The I2C-MUX 50A includes I2C-MUX m1 to m4 that are connected one-to-one with respective target units s1 to s4 by an I2C bus. Moreover, an I2C-MUX 50B includes I2C-MUX m1 to m4 that are connected one-to-one with the respective target units s1 to s4 by an I2C bus that is different from that for connection of the I2C-MUX 50A. For example, the I2C-Mux m1 of the I2C-MUX 50A is connected one-to-one with the target unit s1 having FRT #0 to #3. Also, the I2C-Mux m1 of the I2C-MUX 50B is connected one-to-one with the same target unit s1 but through a different I2C bus. The FPGA 40A, the I2C-MUX 50A, and the MPU 60A of FIG. 9 correspond to the FPGA 10, the I2C-MUX 20, and the control unit 30 of FIG. 1, respectively.

Figure 11:
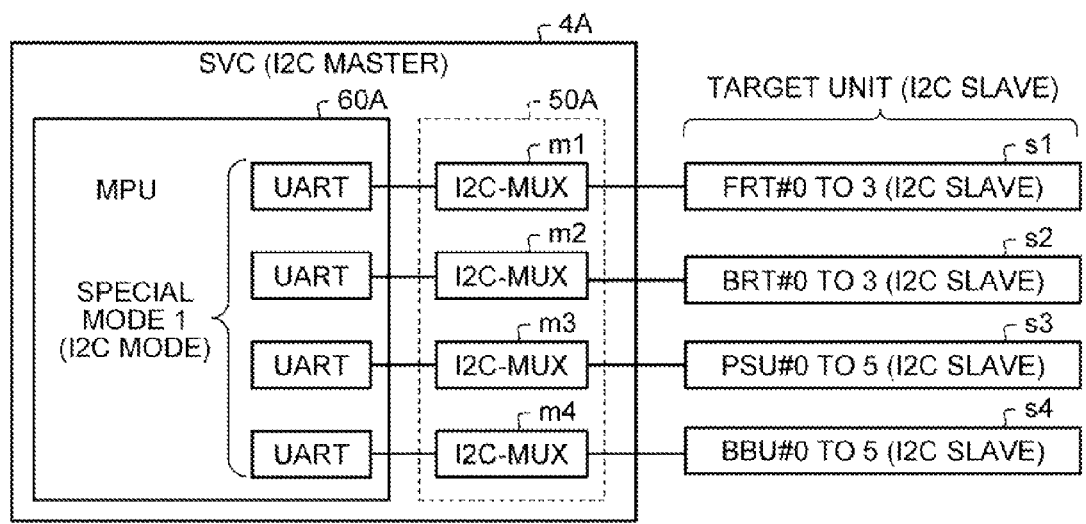
FIG. 11 is a diagram illustrating a connection of a service controller (SVC) with a target unit by the I2C bus.

Referring to FIG. 11, a description is given of connections of the SVC 4A and the target units s1 to s4 by the I2C bus. As illustrated in FIG. 11, the SVC 4A connects a universal asynchronous receiver transmitter (UART) serving as a communication circuit of the MPU 60A with the I2C-MUX 50A in a special mode 1 (I2C mode). The I2C-MUX m1 to m4 of the I2C-MUX 50A are connected with the respective target units s1 to s4 in I2C mode by I2C interface.

Figure 12:
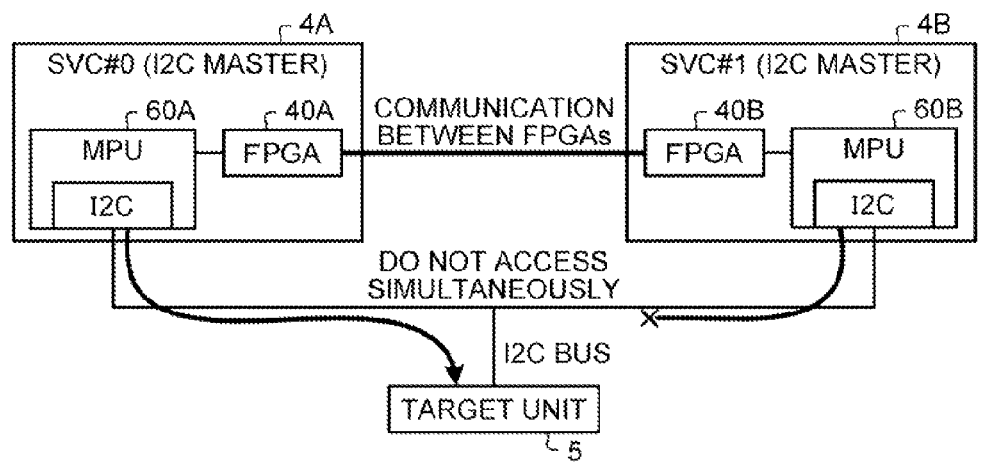
FIG. 12 is a diagram illustrating a communication between field programmable gate arrays (FPGAs) mounted in the SVCs.

Referring to FIG. 12, a description is given of communication between FPGAs mounted in SVCs when abnormal unit determination is executed. As illustrated in FIG. 12, when the SVC 4A is to access the target unit 5, the SVC 4A arbitrates and determines whether to serve as an operating system or a standby system by using the communication between the FPGA thereof and the FPGA of the SVC 4B which is the other redundant system. That is, the arbitration and determination are performed such that the SVCs 4A and 4B do not access the same target unit 5 simultaneously. Moreover, the SVC 4A determines which one of the SVC 4B and the SVC 4A to serve as an operating system or a standby system on a unit basis such as the target unit 5 to be accessed, that is, on a unit basis of the UART to be connected with the target unit 5. The abnormal point determination unit 31a performs the arbitration process to determine the operating system or the standby system by using the communication between the FPGAs as described above.

Figure 13:
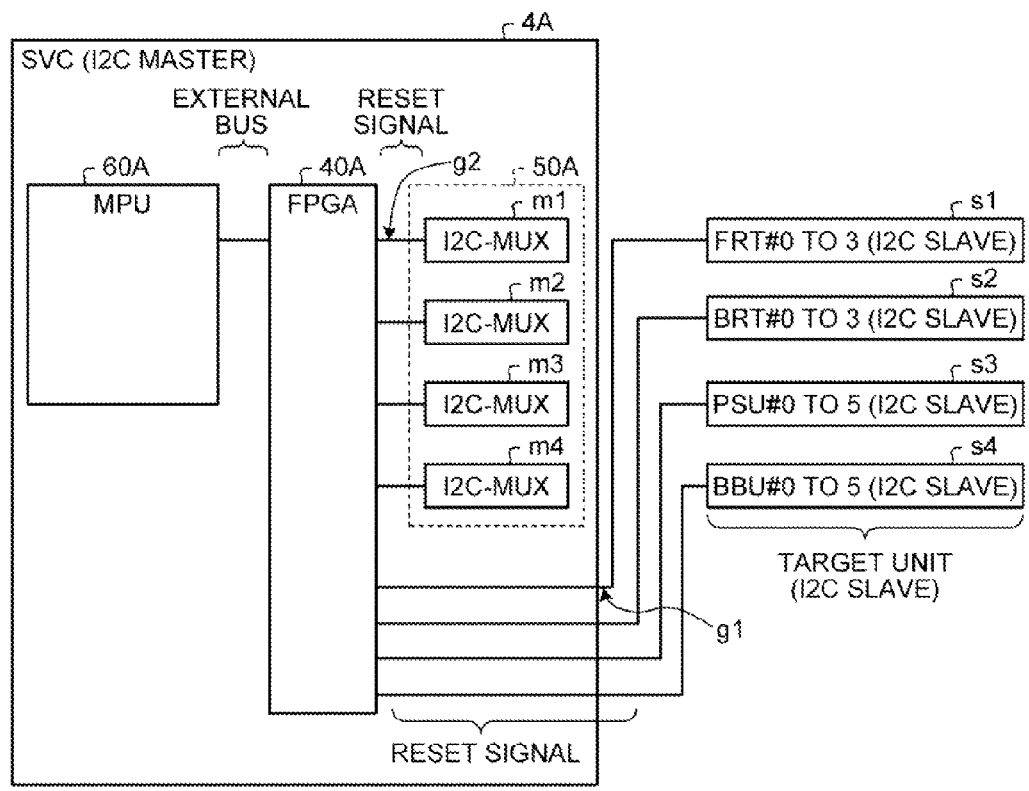
FIG. 13 is a diagram illustrating a reset control using the FPGA mounted in the SVC.

Referring to FIG. 13, a description is given of a reset control using the FPGA mounted on the SVC when there is an abnormal point in execution of the abnormal unit determination. As illustrated in FIG. 13, the FPGA 40A individually resets the target units s1 to s4 of the I2C device. The FPGA 40A also individually resets the I2C-MUX m1 to m4 of the I2C-MUX 50A. As for the I2C-MUX m1 to m4 which are reset, all the connections are then disconnected. The above described abnormal point determination unit 31a performs the reset control when there is an abnormality. For example, if there is a device abnormality "e7" in which desired data is not read from the FRT #0 serving as an I2C device of the target unit s1, the abnormal point determination unit 31a resets the FRT #0 via the FPGA 40A (g1). Moreover, the abnormal point determination unit 31a resets the I2C-MUX m1 via the FPGA 40A if there is an I2C sequence abnormality "e1" in access to the I2C-MUX m1 (g2).

Figure 14:
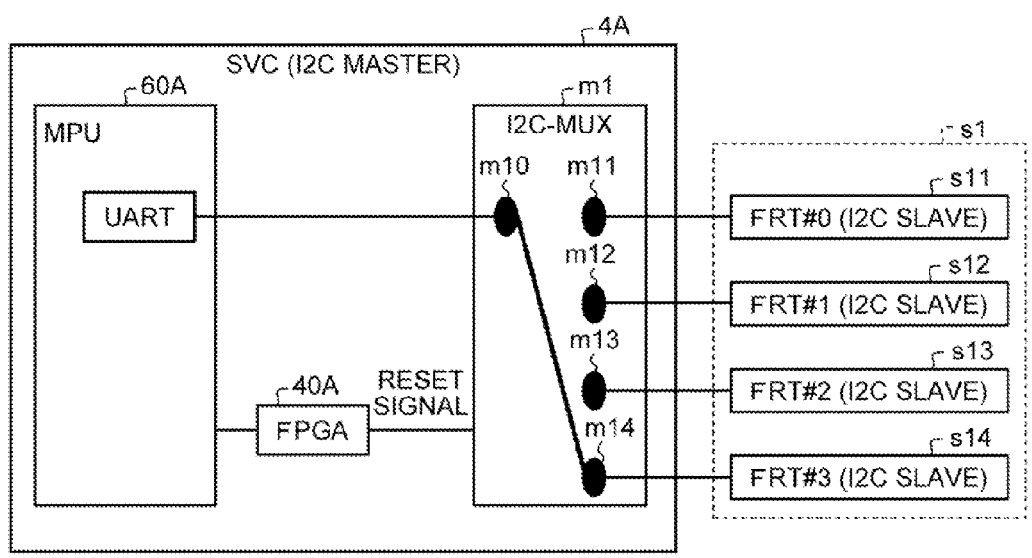
FIG. 14 is a diagram illustrating a connection method of an I2C-MUX mounted in the SVC.

Referring now to FIG. 14, a description is given of a connection method of the I2C-MUX mounted on the SVC 4A or 4B. Assume that one I2C-MUX m1 is mounted on the SVC 4A in a diagram of FIG. 14 for the sake of description. The I2C-MUX m1 includes an input terminal m10 that is connected with UART of the MPU 60A as illustrated in FIG. 14. The I2C-MUX m1 includes a plurality of output terminals m11 to m14 that is connected with respective FRT #0 (s11) to #3 (s14) of the target unit s1, so that the I2C-MUX m1 is connected only to the target unit s1. Therefore, the MPU 60A mounted on the SVC 4A is connected one-to-one with the target unit s1 by the I2C-MUX m1.

Moreover, the I2C-MUX m1 is reset by a reset signal from the FPGA 40A, thereby disconnecting all the connections in the I2C-MUX m1. In FIG. 14, for example, the I2C-MUX m1 is connected to the FRT #3 (s14) of the target unit s1 by the output terminal m14. In this case, when the I2C-MUX m1 is reset by the FPGA 40A, all the connections are disconnected including the connection with the FRT #3 (s14) being already connected.

Procedure for Abnormal Unit Determination According to Embodiment

Next, a description is given of a procedure for determining an abnormal unit according to the embodiment with reference to flowcharts of FIGS. 15A to 20. The flowcharts of FIGS. 15A to 17 illustrate procedures for determining an abnormal unit by an operating SVC, whereas the flowcharts of FIGS. 18 to 20 illustrate procedures for determining an abnormal unit by a standby SVC.

Figure 15A:
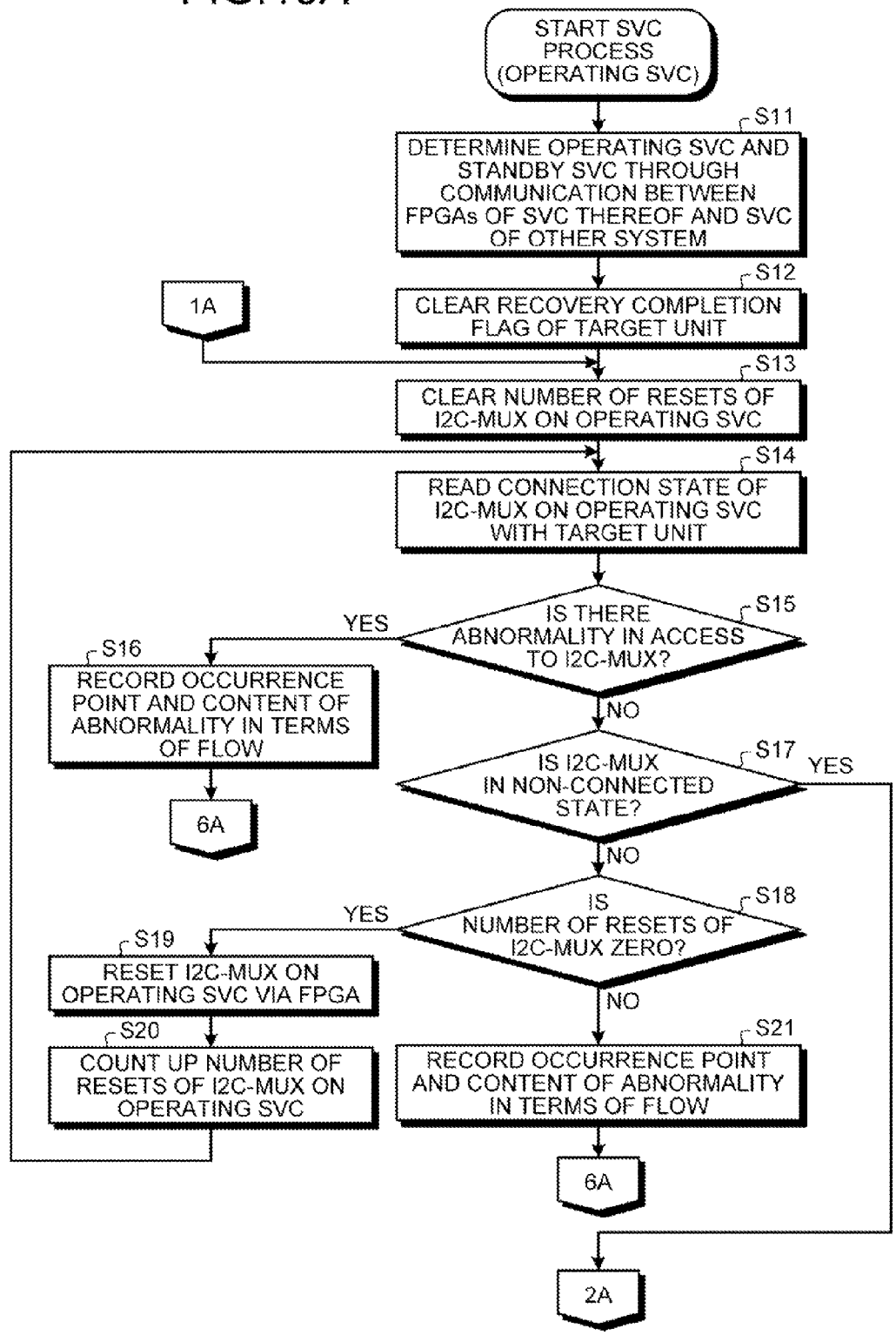
FIG. 15A is a flowchart illustrating a procedure for determining a status abnormality of the I2C-MUX by an operating SVC.
Figure 15C:
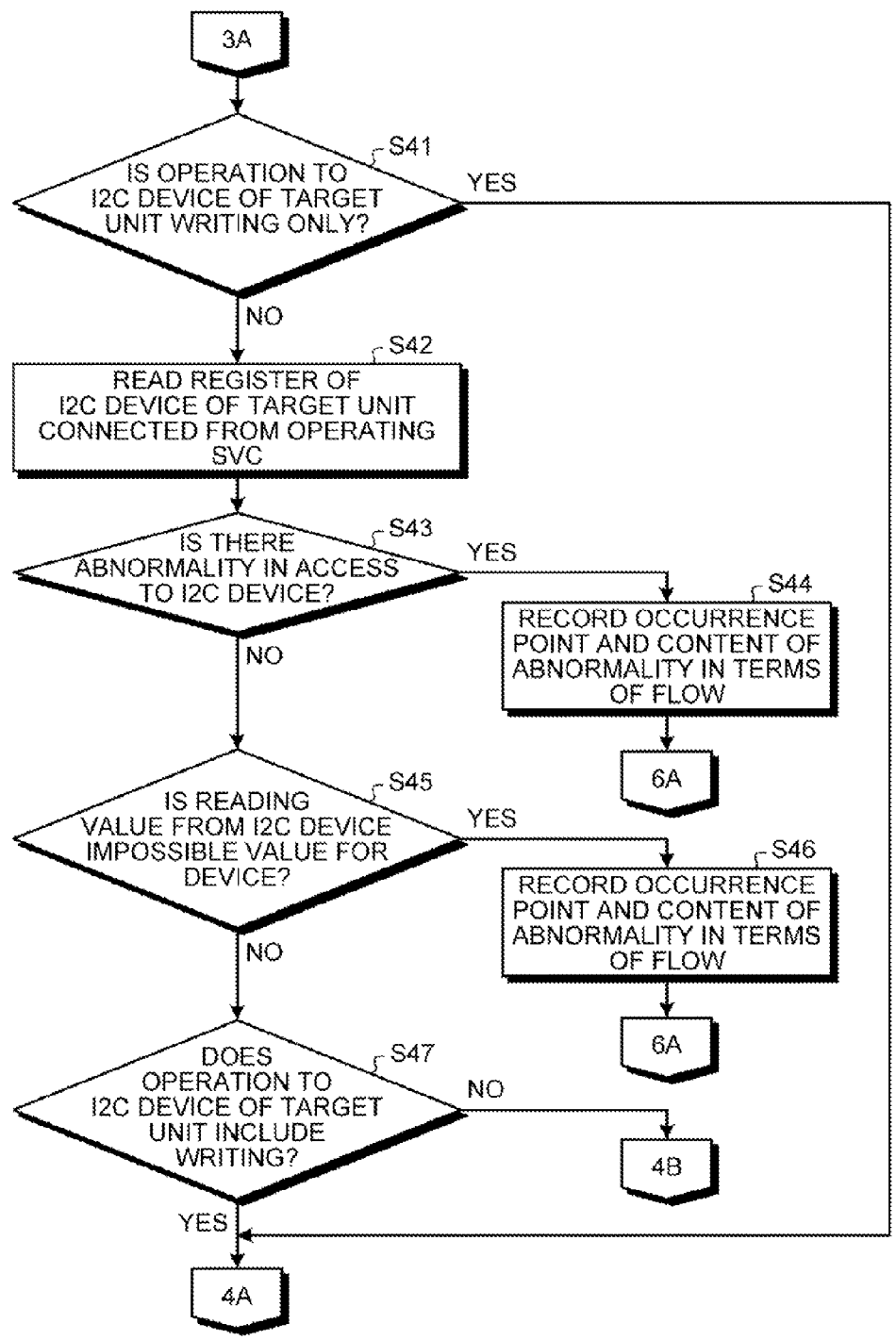
FIG. 15C is a flowchart illustrating a procedure for determining an abnormality in reading from the target unit by the operating SVC.
Figure 15D:
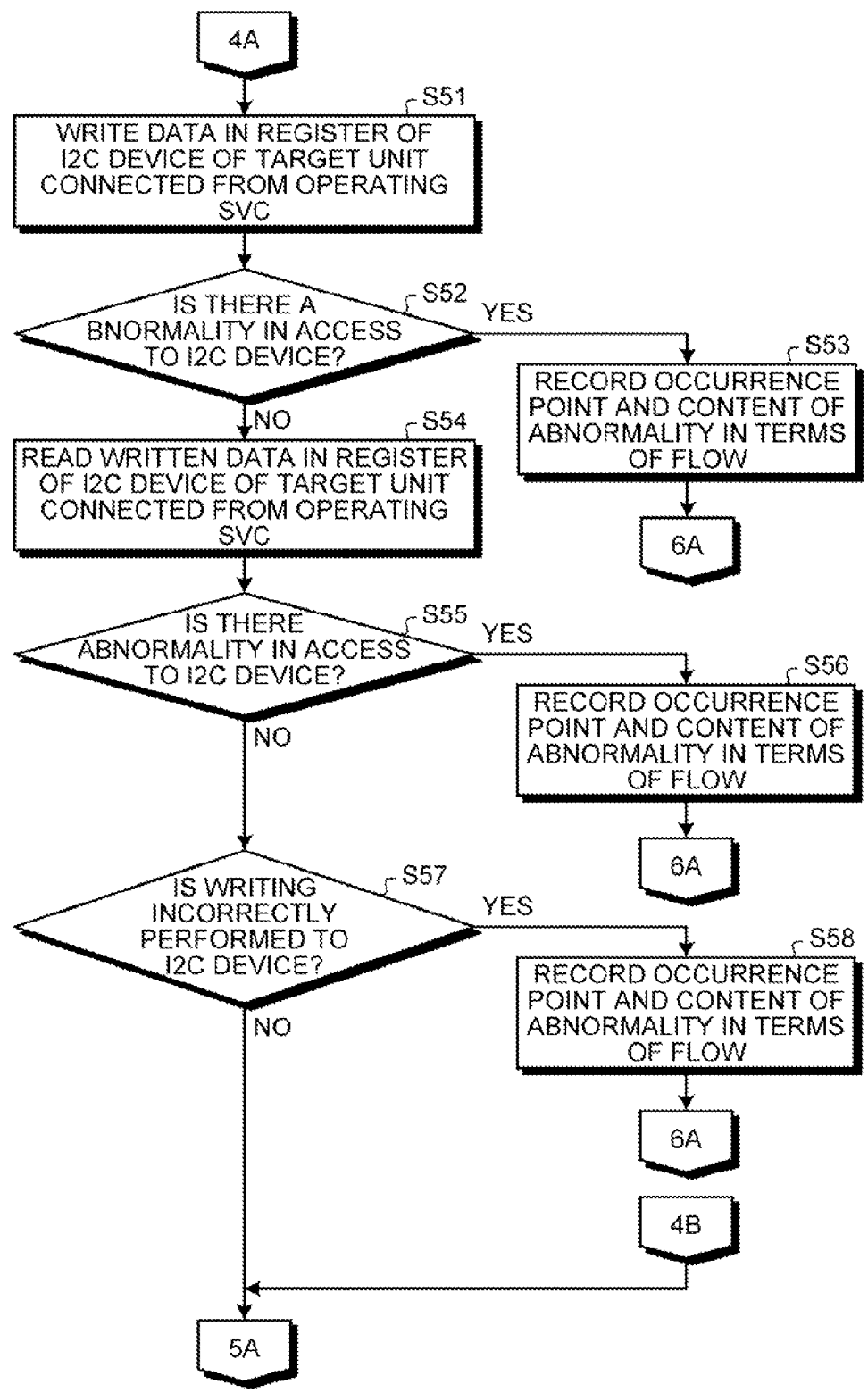
FIG. 15D is a flowchart illustrating a procedure for determining an abnormality in writing to the target unit by the operating SVC.
Figure 15E:
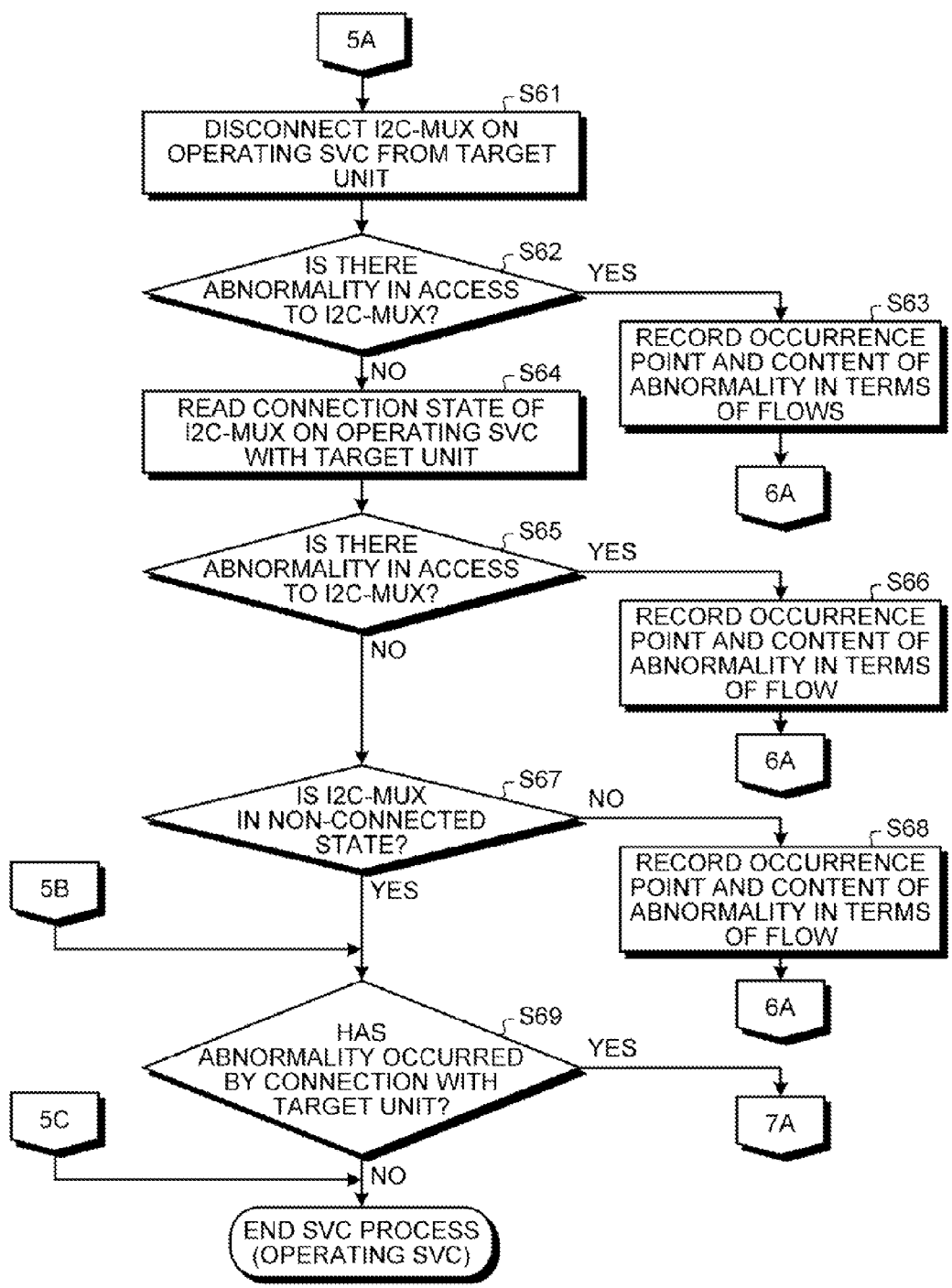
FIG. 15E is a flowchart illustrating a procedure for determining an abnormality in disconnection from the target unit by the operating SVC.

FIGS. 15A to 15E are flowcharts illustrating procedures for determining an abnormal point by the operating SVC in the course of determination of an abnormal unit by the operating SVC. FIG. 15A illustrates a procedure for determining a status abnormality of an I2C-MUX by the operating SVC. FIG. 15B illustrates a procedure for determining an abnormality in connection with a target unit by the operating SVC. FIG. 15C illustrates a procedure for determining an abnormality in reading from the target unit by the operating SVC. FIG. 15D illustrates a procedure for determining an abnormality in writing to the target unit by the operating SVC. FIG. 15E illustrates a procedure for determining an abnormality in disconnection from the target unit by the operating SVC. Assume that the I2C bus device 9 is in operation.

In the I2C master unit 1A of the I2C bus device 9 in operation, the abnormal point determination unit 31a arbitrates and determines whether the I2C master unit 1A is to serve as an operating SVC or a standby SVC by using communication between FPGA thereof and FPGA of the I2C master unit 1B which is the other system (step S11). Herein, assume that the I2C master unit 1A is determined to serve as an operating SVC as a result of the arbitration. Subsequently, the abnormal point determination unit 31a clears a recovery completion flag of a target unit (step S12).

Operating SVC: Determination of Abnormality in Connection Status of I2C-MUX

Next, the abnormal point determination unit 31a clears the number of resets of the I2C-MUX on the operating SVC to zero (step S13). Then, the abnormal point determination unit 31a reads a connection state (status) of the I2C-MUX 20 through the I2C sequence control unit 32 (step S14). The abnormal point determination unit 31a determines whether or not there is an abnormality in access to the I2C-MUX 20 (step S15). When there is an abnormality in the access to the I2C-MUX 20 (Yes in step S15), the abnormal point determination unit 31a stores an abnormality type containing a point of the abnormality occurrence and a content of the abnormality as an access result in the storage unit 40 (step S16). Herein, the abnormality type "e1" is stored as the access result in the storage unit 40, the abnormality type "e1" containing the abnormality occurrence point as a point in which the status of the I2C-MUX 20 is checked and the abnormality content as an I2C sequence abnormality. Then, the flow proceeds to step S71 from which the abnormal point determination unit 31a makes an "access request to the standby SVC".

When there is no abnormality in the access to the I2C-MUX 20 (No in step S15), on the other hand, the abnormal point determination unit 31a determines whether or not the I2C-MUX 20 is in a non-connected state with the target unit 3 (step S17). When the I2C-MUX 20 is determined to be in a non-connected state with the target unit 3 (Yes in step S17), the flow proceeds to step S31 from which the abnormal point determination unit 31a performs "determination of an abnormality in connection with the target unit".

When the I2C-MUX 20 is determined to be not in a non-connected state with the target unit 3 (No in step S17), on the other hand, the abnormal point determination unit 31a is not in the non-connection state as expected. Thus, the abnormal point determination unit 31a determines whether or not the number of resets of the I2C-MUX 20 is zero (step S18). When the number of resets of the I2C-MUX 20 is zero (Yes in step S18), the abnormal point determination unit 31a resets the I2C-MUX 20 on the operating SVC via FPGA (step S19). Subsequently, the abnormal point determination unit 31a counts up the number of resets of the I2C-MUX 20 on the operating SVC (step S20). Then, the flow proceeds back to step S14, so that the abnormal point determination unit 31a reattempts to access the I2C-MUX 20.

When the number of resets of the I2C-MUX 20 is not zero (No in step S18), on the other hand, the abnormal point determination unit 31a stores an abnormality type containing a point of an abnormality occurrence and a content of the abnormality as an access result in the storage unit 40 (step S21). Herein, the abnormality type "e2" is stored as the access result in the storage unit 40, the abnormality type "e2" containing the abnormality occurrence point as a point in which the status of the I2C-MUX 20 is checked and the abnormality content as an I2C device abnormality. Then, the flow proceeds to step S71 from which the abnormal point determination unit 31a makes an "access request to the standby SVC".

Operating SVC: Determination of Abnormality in Connection with Target Unit

Next, the abnormal point determination unit 31a connects the I2C-MUX 20 on the operating SVC with the target unit 3 through the I2C sequence control unit 32 (step S31). Then, the abnormal point determination unit 31a determines whether or not there is an abnormality in access to the I2C-MUX 20 (step S32). When there is an abnormality in the access to the I2C-MUX 20 (Yes in step S32), the abnormal point determination unit 31a stores an abnormality type containing a point of the abnormality occurrence and a content of the abnormality as an access result in the storage unit 40 (step S33). Herein, the abnormality type "e3" is stored in the storage unit 40, the abnormality type "e3" containing the abnormality occurrence point as a point in which the I2C-MUX 20 is connected with the target unit 3 and the abnormality content as an I2C sequence abnormality. Then, the flow proceeds to step S71 from which the abnormal point determination unit 31a makes the "access request to the standby SVC".

When there is no abnormality in the access to the I2C-MUX 20 (No in step S32), the abnormal point determination unit 31a reads a connection state of the I2C-MUX 20 on the operating SVC with the target unit 3 (step S34). Subsequently, the abnormal point determination unit 31a determines whether or not there is an abnormality in the access to the I2C-MUX 20 by use of a register of the I2C-MUX 20 (step S35). When there is an abnormality in the access to the I2C-MUX 20 (Yes in step S35), the abnormal point determination unit 31a stores an abnormality type containing a point of an abnormality occurrence and a content of the abnormality as an access result in the storage unit 40 (step S36). Herein, the abnormality type "e4" is stored in the storage unit 40, the abnormality type "e4" containing the abnormality occurrence point as a point in which a connection of the I2C-MUX 20 with the target unit 3 is confirmed and the abnormality content as an I2C sequence abnormality. Then, the flow proceeds to step S71 from which the abnormal point determination unit 31a makes the "access request to the standby SVC".

When there is no abnormality in the access to the I2C-MUX 20 (No in step S35), on the other hand, the abnormal point determination unit 31a determines whether or not the I2C-MUX 20 is connected only with the target unit 3 (step S37). When the I2C-MUX 20 is not connected only with the target unit 3 (No in step S37), the abnormal point determination unit 31a stores an abnormality type containing a point of an abnormality occurrence and a content of the abnormality as an access result in the storage unit 40 (step S38). Herein, the abnormality type "e5" is stored in the storage unit 40, the abnormality type "e5" containing the abnormality occurrence point as a point in which a connection of the I2C-MUX 20 with the target unit 3 is confirmed and the abnormality content as an I2C device abnormality. Then, the flow proceeds to step S71 from which the abnormal point determination unit 31a makes the "access request to the standby SVC".

When the I2C-MUX 20 is determined to be connected only to the target unit 3 (Yes in step S37), on the other hand, the flow proceeds to step S41 from which the abnormal point determination unit 31a performs "determination of an abnormality in reading from the target unit".

Operating SVC: Determination of Abnormality in Reading from Target Unit

Next, the abnormal point determination unit 31a determines whether or not the operation to the I2C device of the target unit 3 is writing only (step S41). When the operation to the I2C device of the target unit 3 is writing only (Yes in step S41), the flow proceeds to step S51 from which the abnormal point determination unit 31a performs "determination of an abnormality in writing to the target unit".

When the operation to the I2C device of the target unit 3 is not writing only (No in step S41), the abnormal point determination unit 31a reads a register of the I2C device of the target unit 3 which is connected from the side of the operating SVC (step S42). Then, the abnormal point determination unit 31a determines whether or not there is an abnormality in access to the I2C device (step S43). When there is an abnormality in the access to the I2C device (Yes in step S43), the abnormal point determination unit 31a stores an abnormality type containing a point of the abnormality occurrence and a content of the abnormality as an access result in the storage unit 40 (step S44). Herein, the abnormality type "e6" is stored in the storage unit 40, the abnormality type "e6" containing the abnormality occurrence point as a point to access the target unit and the abnormality content as an I2C sequence abnormality. Then, the flow proceeds to step S71 from which the abnormal point determination unit 31a makes the "access request to the standby SVC".

When there is no abnormality in the access to the I2C device (No in step S43), on the other hand, the abnormal point determination unit 31a determines whether or not the reading value from the I2C device is an impossible value for the I2C device (step S45). When the reading value from the I2C device is determined to be an impossible value to the I2C device (Yes in step S45), the abnormal point determination unit 31a stores an abnormality type containing a point of the abnormality occurrence and a content of the abnormality as an access result in the storage unit 40 (step S46). Herein, the abnormality type "e7" is stored in the storage unit 40, the abnormality type "e7" containing the abnormality occurrence point as a point to access the target unit and the abnormality content as an I2C device abnormality. Then, the flow proceeds to step S71 from which the abnormal point determination unit 31a makes the "access request to the standby SVC".

When the reading value from the I2C device is determined to be a possible value (No in step S45), the abnormal point determination unit 31a determines whether or not the operation to the I2C device of the target unit 3 includes writing (step S47). When the operation to the I2C device of the target unit 3 does not include the writing (reading only) (No in step S47), the flow proceeds to step S61 from which the abnormal point determination unit 31a performs "determination of an abnormality in disconnection from the target unit".

When the operation to the I2C device of the target unit 3 is determined to include the writing (Yes in step S47), the flow proceeds to step S51 from which the abnormal point determination unit 31a performs "determination of an abnormality in writing to the target unit".

Operating SVC: Determination of Abnormality in Writing to Target Unit

Next, the abnormal point determination unit 31a writes data in a register of the I2C device of the target unit 3 which is connected from the side of the operating SVC (step S51). Then, the abnormal point determination unit 31a determines whether or not there is an abnormality in access to the I2C device (step S52). When there is an abnormality in the access to the I2C device (Yes in step S52), the abnormal point determination unit 31a stores an abnormality type containing a point of the abnormality occurrence and a content of the abnormality as an access result in the storage unit 40 (step S53). Herein, the abnormality type "e6" is stored in the storage unit 40, the abnormality type "e6" containing the abnormality occurrence point as a point to access the target unit and the abnormality content as an I2C sequence abnormality. Then, the flow proceeds to step S71 from which the abnormal point determination unit 31a makes the "access request to the standby SVC".

On the other hand, when there is no abnormality in the access to the I2C device (No in step S52), the abnormal point determination unit 31a reads the data in the register of the I2C device of the target unit 3 to check the written data (step S54), the register having undergone the writing. Then, the abnormal point determination unit 31a determines whether or not there is an abnormality in access to the I2C device (step S55). When there is an abnormality in the access to the I2C device (Yes in step S55), the abnormal point determination unit 31a stores an abnormality type containing a point of the abnormality occurrence and a content of the abnormality as an access result in the storage unit 40 (step S56). Herein, the abnormality type "e6" is stored in the storage unit 40, the abnormality type "e6" containing the abnormality occurrence point as a point to access the target unit and the abnormality content as an I2C sequence abnormality. Then, the flow proceeds to step S71 from which the abnormal point determination unit 31a makes the "access request to the standby SVC".

When there is no abnormality in the access to the I2C device (No in step S55), on the other hand, the abnormal point determination unit 31a determines whether or not the writing is incorrectly performed to the I2C device (step S57). Specifically, the abnormal point determination unit 31a compares the data which has been written in the register of the I2C device with the data which has been read from the same register, and determines whether or not these data are not the same. When the writing is incorrectly performed to the I2C device (Yes in step S57), the abnormal point determination unit 31a stores an abnormality type containing a point of the abnormality occurrence and a content of the abnormality as an access result in the storage unit 40 (step S58). Herein, the abnormality type "e7" is stored in the storage unit 40, the abnormality type "e7" containing the abnormality occurrence point as a point to access the target unit and the abnormality content as an I2C device abnormality. Then, the flow proceeds to step S71 from which the abnormal point determination unit 31a makes the "access request to the standby SVC".

When the writing is correctly performed to the I2C device (No in step S57), on the other hand, the flow proceeds to step S61 from which the abnormal point determination unit 31a performs the "determination of an abnormality in disconnection from the target unit".

Operating SVC: Determination of Abnormality in Disconnection from Target Unit

Next, the abnormal point determination unit 31a disconnects the I2C-MUX 20 on the operating SVC from the target unit 3 (step S61). Subsequently, the abnormal point determination unit 31a determines whether or not there is an abnormality in access to the I2C-MUX 20 (step S62). When there is an abnormality in the access to the I2C-MUX (Yes in step S62), the abnormal point determination unit 31a stores an abnormality type containing a point of the abnormality occurrence and a content of the abnormality as an access result in the storage unit 40 (step S63). Herein, the abnormality type "e8" is stored in the storage unit 40, the abnormality type "e8" containing the abnormality occurrence point as a point in which the disconnection of the I2C-MUX 20 from the target unit 3 is confirmed and the abnormality content as an I2C sequence abnormality. Then, the flow proceeds to step S71 from which the abnormal point determination unit 31a makes the "access request to the standby SVC".

When there is no abnormality in access to the I2C-MUX 20 (No in Step S62), the abnormal point determination unit 31a reads a connection state of the I2C-MUX 20 on the operating SVC with the target unit 3 (step S64). Subsequently, the abnormal point determination unit 31a determines whether or not there is an abnormality in access to the I2C-MUX 20 by use of a register of the I2C-MUX 20 (step S65). When there is an abnormality in the access to the I2C-MUX 20 (Yes in step S65), the abnormal point determination unit 31a stores an abnormality type containing a point of the abnormality occurrence and a content of the abnormality as an access result in the storage unit 40 (step S66). Herein, the abnormality type "e9" is stored in the storage unit 40, the abnormality type "e9" containing the abnormality occurrence point as a point in which the disconnection of the I2C-MUX 20 from the target unit 3 is confirmed and the abnormality content as an I2C sequence abnormality. Then, the flow proceeds to step S71 from which the abnormal point determination unit 31a makes the "access request to the standby SVC".

When there is no abnormality in the access to the I2C-MUX 20 (No in step S65), on the other hand, the abnormal point determination unit 31a determines whether or not the I2C-MUX 20 is in a non-connected state (step S67). When the I2C-MUX 20 is determined to be not in the non-connected state (No in step S67), the I2C-MUX 20 is not in the non-connection state as expected. Thus, the abnormal point determination unit 31a stores an abnormality type containing a point of the abnormality occurrence and a content of the abnormality as an access result in the storage unit 40 (step S68). Herein, the abnormality type "e10" is stored in the storage unit 40, the abnormality type "e10" containing the abnormality occurrence point as a point in which the disconnection of the I2C-MUX 20 from the target unit 3 is confirmed and the abnormality content as an I2C device abnormality. Then, the flow proceeds to step S71 from which the abnormal point determination unit 31a makes the "access request to the standby SVC".

On the other hand, when the I2C-MUX 20 is in the non-connected state (Yes in step S67), or when the abnormal unit determination unit 31c receives an access result from the standby SVC (Yes in step S73), the abnormal point determination unit 31a performs the following procedure. That is, the abnormal point determination unit 31a determines whether or not an abnormality has occurred by connection of the operating SVC with the target unit 3 (step S69). For example, the abnormal point determination unit 31a can determine whether or not the abnormality types excluding the normality of the operating SVC are stored in the storage unit 40. Then, when the abnormal point determination unit 31a determines that the abnormality has occurred by the connection of the operating SVC with the target unit 3 (Yes in step S69), the flow proceeds to step S81 from which the abnormal point determination unit 31a performs "determination of abnormal unit". On the other hand, when no abnormality has occurred by the connection of the operating SVC with the target unit 3 (No in step S69), or when the determination of the abnormal unit is completed, the abnormal point determination unit 31a ends the abnormal unit determination.

Operating SVC: Access Request to Standby SVC

FIG. 16 is a flowchart illustrating a procedure for making an access request to the standby SVC.

When there is an abnormal point in the connection to the target unit 3 by the abnormal point determination unit 31a, that is, there is an abnormal point in access to the target unit 3, the access request unit 31b resets the I2C-MUX 20 on the operating SVC via FPGA (step S71). Such a reset is performed so that operation in the standby SVC is not affected.

Subsequently, the access request unit 31b requests the standby SVC via communication between the FPGAs to perform the process that was planned to be performed by the operating SVC (step S72). That is, the access request unit 31b requests the standby SVC to access the target unit to which the access abnormality has occurred in the operating SVC.

Then, the abnormal unit determination unit 31c determines whether or not an access result of the standby SVC has been received via the communication between the FPGAs (step S73). When the access result of the standby SVC has not been received (No in step S73), the flow proceeds back to step S73 so that the abnormal unit determination unit 31c performs determination again. When the access result of the standby SVC has been received (Yes in step S73), the flow proceeds to step S69 so that the abnormal unit determination unit 31c determines an abnormal unit.

Operating SVC: Abnormal Unit Determination

FIG. 17 is a flowchart illustrating a procedure for determining an abnormal unit.

When receiving the access result from the standby SVC, the abnormal unit determination unit 31c determines an abnormal unit by using the abnormal unit determination matrix 41 (step S81). That is, the abnormal unit determination unit 31c determines the abnormal unit by using the abnormal unit determination matrix 41 which contains an access result to the target unit 3 by the operating SVC in a horizontal axis and an access result to the target unit 3 by the standby SVC in a vertical axis. For example, the abnormal unit determination unit 31c determines an abnormal unit by the combination of abnormality determination information of each of the operating SVC and the standby SVC stored in the abnormal unit determination matrix 41 and the combination of each of the access results.

Subsequently, the abnormal unit determination unit 31c determines whether or not the abnormal unit is the target unit 3 based on the result of determination (step S82). When the abnormal unit is not the target unit 3, that is, the abnormal unit is determined to be either the operating SVC or the standby SVC (No in step S82), the abnormal unit determination unit 31c clears a recovery completion flag of the target unit to zero (step S83). Then, the flow proceeds to step S88 so that the abnormal unit determination unit 31c further performs the determination of the abnormal unit.

When the abnormal unit is determined to be the target unit 3 (Yes in step S82), on the other hand, the abnormal unit determination unit 31c uses the recovery completion flag of the target unit to determine whether or not recovery is completed (step S84). When the recovery is completed (Yes in step S84), the abnormal unit determination unit 31c ascertains that the target unit is the abnormal unit (step S85).

When the recovery is not completed (No in step S84), on the other hand, the abnormal unit determination unit 31c resets the I2C device of the target unit 3 from the FPGA on the operating SVC (step S86). Subsequently, the abnormal unit determination unit 31c sets the recovery completion flag of the target unit (step S87). Then, the flow proceeds to step S13 so that the abnormal unit determination unit 31c reattempts to access the target unit 3.

After the abnormal unit is determined not to be the target unit 3 and step S83 is performed, the abnormal unit determination unit 31c determines whether or not the abnormal unit is the operating SVC (step S88). When the abnormal unit is determined to be the operating SVC (Yes in step S88), the abnormal unit determination unit 31c ascertains that the operating SVC is the abnormal unit (step S89).

On the other hand, when the abnormal unit is determined not to be the operating SVC (No in step S88), the abnormal unit determination unit 31c determines whether or not the abnormal unit is the standby SVC (step S90). When the abnormal unit is determined to be the standby SVC (Yes in step S90), the abnormal unit determination unit 31c ascertains that the standby SVC is the abnormal unit (step S91). Then, the abnormal unit determination unit 31c ends the abnormal unit determination procedure. After the abnormal unit is determined not to be the standby SVC (No in step S90), the abnormal unit determination unit 31c also ends the abnormal unit determination procedure.

Standby SVC: Access Request Wait

FIG. 18 is a flowchart illustrating a procedure for awaiting an access request by the standby SVC.

In the I2C master unit 1B, first, an abnormal point determination unit 31a arbitrates and determines whether the I2C master unit 1B is to serve as an operating SVC or a standby SVC by using communication between SPGA thereof and FPGA of the I2C master unit 1A which is the other system (step S101). Herein, assume that the I2C master unit 1B is determined to serve as a standby SVC as a result of the arbitration with the I2C master unit 1A.

Subsequently, the abnormal point determination unit 31a determines whether or not the access request for access to the target unit 3 has been received (step S102). That is, the abnormal point determination unit 31a awaits receipt of the access request for the process, which was planned to be performed by the operating SVC, through communication between the FPGAs. When the abnormal point determination unit 31a determines that the access request for access to the target unit 3 has not been received (No in step S102), the flow proceeds to step S102 so that the abnormal point determination unit 31a performs the determination again. When the abnormal point determination unit 31a determines that the access request for access to the target unit 3 has been received (Yes in step S102), the flow proceeds to step S111 from which "determination of an abnormality in a connection state of the I2C-MUX" is performed.

Figure 19B:
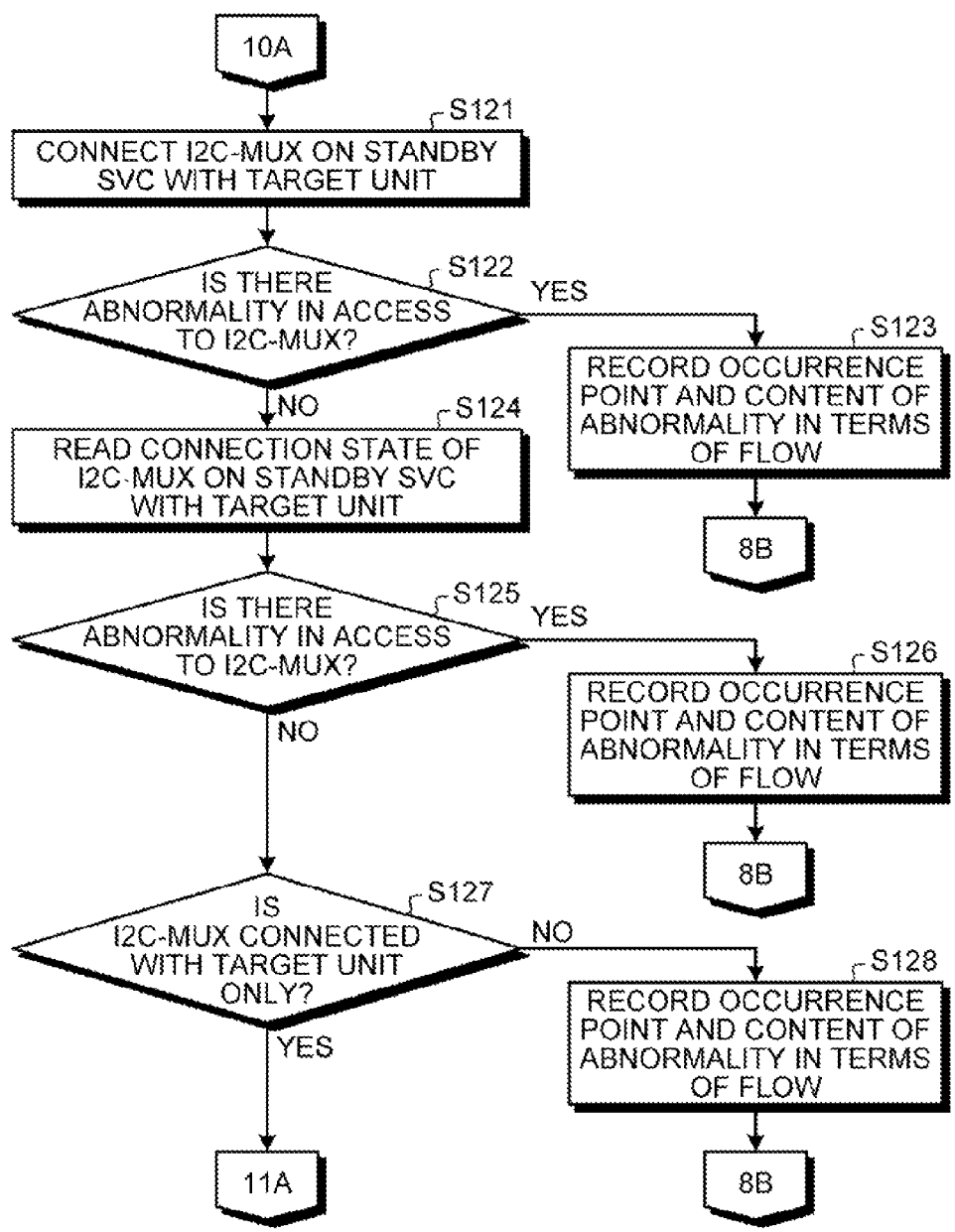
FIG. 19B is a flowchart illustrating a procedure for determining an abnormality in connection with a target unit by the standby SVC.
Figure 19C:
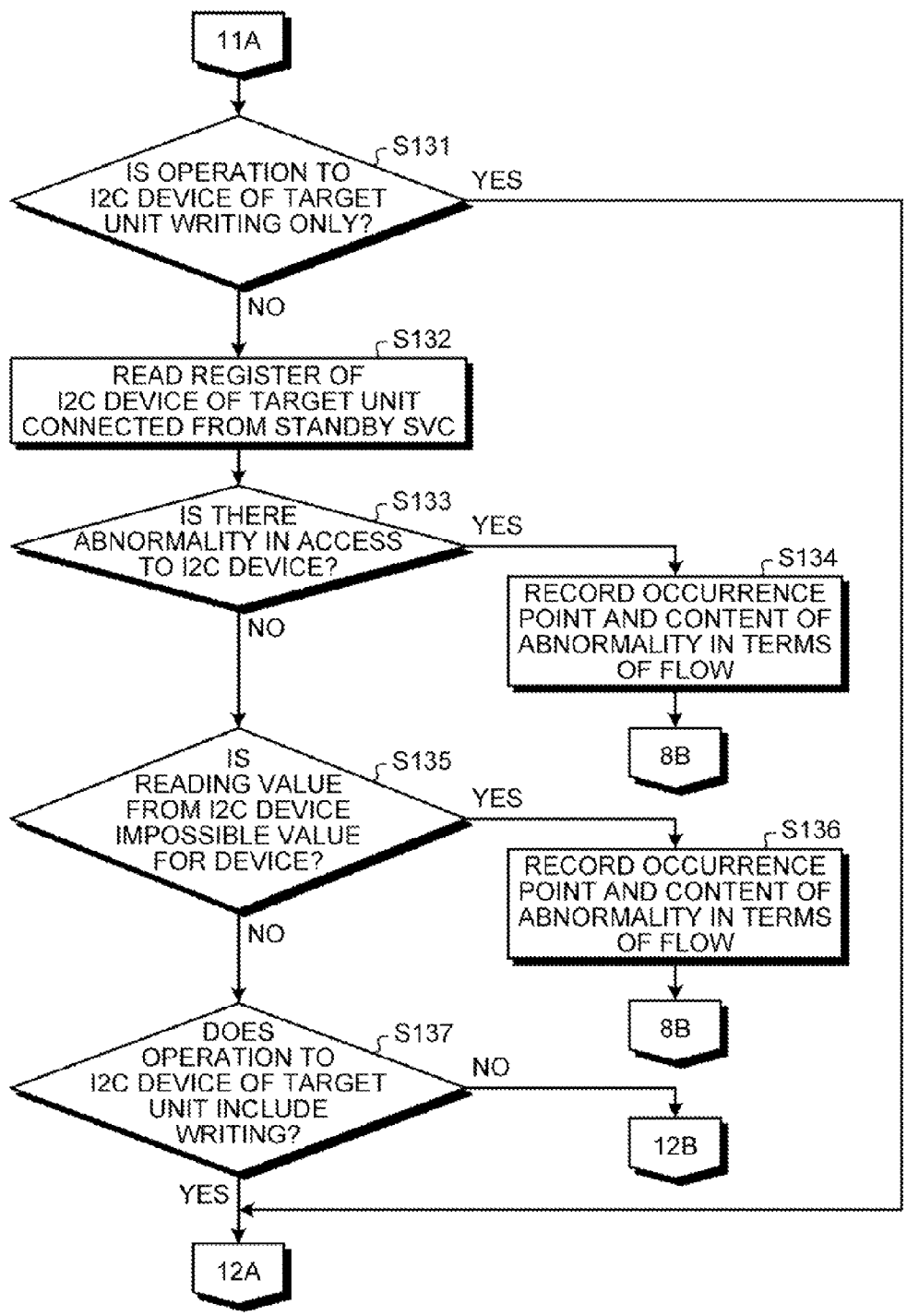
FIG. 19C is a flowchart illustrating a procedure for determining an abnormality in reading from the target unit by the standby SVC.
Figure 19D:
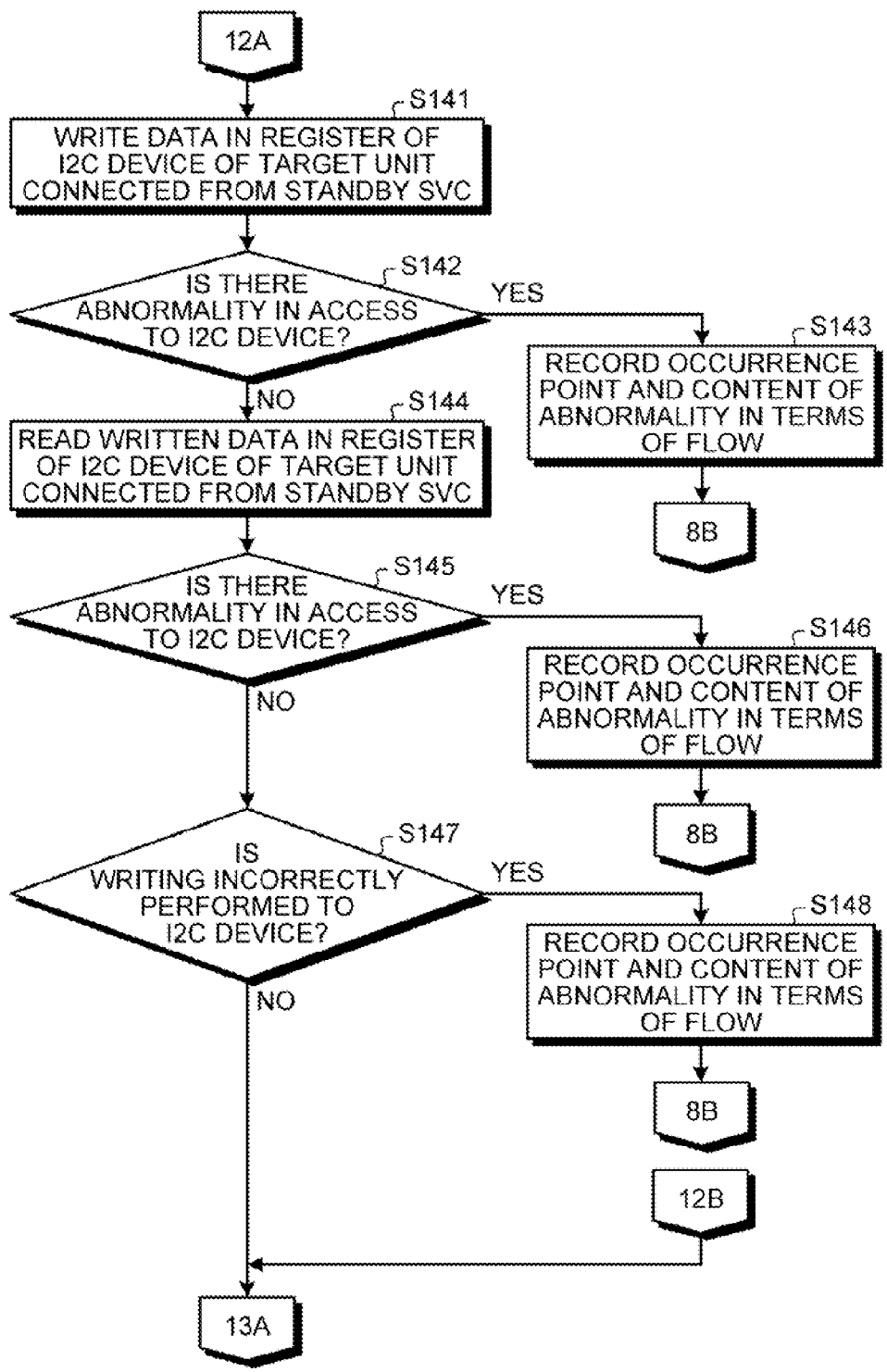
FIG. 19D is a flowchart illustrating a procedure for determining an abnormality in writing to the target unit by the standby SVC.

FIG. 19A to 19E are flowcharts illustrating procedures for determining an abnormal point by the standby SVC in the course of determination of an abnormal unit by the standby SVC. FIG. 19A illustrates a procedure for determining a status abnormality of an I2C-MUX by the standby SVC. FIG. 19B illustrates a procedure for determining an abnormality in connection with a target unit by the standby SVC. FIG. 19C illustrates a procedure for determining an abnormality in reading from the target unit by the standby SVC. FIG. 19D illustrates a procedure for determining an abnormality in writing to the target unit by the standby SVC. FIG. 19E illustrates a procedure for determining an abnormality in disconnection from the target unit by the standby SVC. Assume that the abnormal point determination unit 31a receives an access request for access to the target unit 3 from the operating SVC.

Standby SVC: Determination of Abnormality in Connection State of I2C-MUX

Upon receipt of the access request for access to the target unit 3, the abnormal point determination unit 31a clears the number of resets of the I2C-MUX on the standby SVC to zero (step S111). Subsequently, the abnormal point determination unit 31a reads a connection state (status) of the I2C-MUX 20 through the I2C sequence control unit 32 (step S112). Then, the abnormal point determination unit 31a determines whether or not there is an abnormality in access to the I2C-MUX 20 (step S113). When there is an abnormality in the access to the I2C-MUX 20 (Yes in step S113), the abnormal point determination unit 31a stores an abnormality type containing a point of the abnormality occurrence and a content of the abnormality as an access result in the storage unit 40 (step S114). Herein, the abnormality type "e1" is stored in the storage unit 40, the abnormality type "e1" containing the abnormality occurrence point as a point in which the status of the I2C-MUX 20 is checked and the abnormality content as an I2C sequence abnormality. Then, the flow proceeds to step S161 from which the abnormal point determination unit 31a performs "notification of an access result to the operating SVC".

When there is no abnormality in the access to the I2C-MUX 20 (No in step S113), on the other hand, the abnormal point determination unit 31a determines whether or not the I2C-MUX 20 is in a non-connected state with the target unit 3 (step S115). When the I2C-MUX 20 is determined to be in the non-connected state with the target unit 3 (Yes in step S115), the flow proceeds to step S121 from which the abnormal point determination unit 31a performs "determination of an abnormality in connection with the target unit".

On the other hand, when the I2C-MUX 20 is determined to be not in the non-connected state with the target unit 3 (No in step S115), the abnormal point determination unit 31a determines that the I2C-MUX 20 is not in the non-connected state as expected. Accordingly, the abnormal point determination unit 31a determines whether or not the number of resets of the I2C-MUX 20A is zero (step S116). When the number of resets of the I2C-MUX 20A is zero (Yes in step S116), the abnormal point determination unit 31a resets the I2C-MUX 20 on the standby SVC through the FPGA (step S117). Subsequently, the abnormal point determination unit 31a counts up the number of resets of the I2C-MUX 20 on the standby SVC (step S118). Then, the flow proceeds to step S112 so that the abnormal point determination unit 31a performs a reattempt to access the I2C-MUX 20.

On the other hand, when the number of resets of the I2C-MUX 20 is not zero, (No in step S116), the abnormal point determination unit 31a stores an abnormality type containing a point of the abnormality occurrence and a content of the abnormality as an access result in the storage unit 40 (step S119). Herein, the abnormality type "e2" is stored in the storage unit 40, the abnormality type "e2" containing the abnormality occurrence point as a point in which the status of the I2C-MUX 20 is checked and the abnormality content as an I2C device abnormality. Then, the flow proceeds to step S161 from which the abnormal point determination unit 31*a* performs the "notification of the access result to the operating SVC".

Standby SVC: Determination of Abnormality in Connection with Target Unit

Next, the abnormal point determination unit 31*a* connects the I2C-MUX 20 on the standby SVC with the target unit 3 through the I2C sequence control unit 32 (step S121). Subsequently, the abnormal point determination unit 31*a* determines whether or not there is an abnormality in access to the I2C-MUX 20 (step S122). When there is an abnormality in the access to the I2C-MUX 20 (Yes in step S122), the abnormal point determination unit 31*a* stores an abnormality type containing a point of the abnormality occurrence and a content of the abnormality as an access result in the storage unit 40 (step S123). Herein, the abnormality type "e3" is stored in the storage unit 40, the abnormality type "e3" containing the abnormality occurrence point as a point in which the I2C-MUX 20 is connected with the target unit 3 and the abnormality content as an I2C sequence abnormality. Then, the flow proceeds to step S161 from which the abnormal point determination unit 31*a* performs the "notification of the access result to the operating SVC".

When there is no abnormality in the access to the I2C-MUX 20 (No in step S122), the abnormal point determination unit 31*a* reads a connection state of the I2C-MUX 20 on the standby SVC with the target unit 3 (step S124). Then, the abnormal point determination unit 31*a* determines whether or not there is an abnormality in the access to the I2C-MUX 20 by use of a register of the I2C-MUX 20 (step S125). When there is an abnormality in the access to the I2C-MUX 20 (Yes in step S125), the abnormal point determination unit 31*a* stores an abnormality type containing a point of the abnormality occurrence and a content of the abnormality as an access result in the storage unit 40 (step S126). Herein, the abnormality type "e4" is stored in the storage unit 40, the abnormality type "e4" containing the abnormality occurrence point as a point in which the connection of the I2C-MUX 20 with the target unit 3 is confirmed and the abnormality content as an I2C sequence abnormality. Then, the flow proceeds to step S161 from which the abnormal point determination unit 31*a* performs the "notification of the access result to the operating SVC".

On the other hand, when there is no abnormality in the access to the I2C-MUX 20 (No in step S125), the abnormal point determination unit 31*a* determines whether or not the I2C-MUX 20 is connected only with the target unit 3 (step S127). When the I2C-MUX 20 is not connected with the target unit 3 only (No in step S127), the abnormal point determination unit 31*a* stores an abnormality type containing a point of the abnormality occurrence and a content of the abnormality as an access result in the storage unit 40 (step S128). Herein, the abnormality type "e5" is stored in the storage unit 40, the abnormality type "e5" containing the abnormality occurrence point as a point in which the connection of the I2C-MUX 20 with the target unit 3 is confirmed and the abnormality content as an I2C device abnormality. Then, the flow proceeds to step S161 from which the abnormal point determination unit 31*a* performs the "notification of the access result to the operating SVC".

On the other hand, when the I2C-MUX 20 is connected only with the target unit 3 (Yes in step S127), the flow proceeds to step S131 from which the abnormal point determination unit 31*a* performs "determination of an abnormality in reading from the target unit".

Standby SVC: Determination of Abnormality in Reading from Target Unit

Next, the abnormal point determination unit 31*a* determines whether or not the operation to the I2C device of the target unit 3 is only writing (step S131). When the operation to the I2C device of the target unit 3 is determined to be the writing only (Yes in step S131), the flow proceeds to step S141 from which the abnormal point determination unit 31*a* performs "determination of an abnormality in writing to the target unit".

On the other hand, when the operation to the I2C device of the target unit 3 is not the writing only (No in step S131), the abnormal point determination unit 31*a* reads a register of the I2C device of the target unit 3 connected from the side of the standby SVC (step S132). Then, the abnormal point determination unit 31*a* determines whether or not there is an abnormality in access to the I2C device (step S133). When there is an abnormality in the access to the I2C device (Yes in step S133), the abnormal point determination unit 31*a* stores an abnormality type containing a point of the abnormality occurrence and a content of the abnormality as an access result in the storage unit 40 (step S134). Herein, the abnormality type "e6" is stored in the storage unit 40, the abnormality type "e6" containing the abnormality occurrence point as a point to access the target unit and the abnormality content as an I2C sequence abnormality. Then, the flow proceeds to step S161 from which the abnormal point determination unit 31*a* performs the "notification of the access result to the operating SVC".

On the other hand, when there is no abnormality in the access to the I2C device (No in step S133), the abnormal point determination unit 31*a* determines whether or not a reading value from the I2C device is an impossible value for the I2C device (step S135). When the reading value from the I2C device is determined to be an impossible value for the I2C device (Yes in step S135), the abnormal point determination unit 31*a* stores an abnormality type containing a point of the abnormality occurrence and a content of the abnormality as an access result in the storage unit 40 (step S136). Herein, the abnormality type "e7" is stored in the storage unit 40, the abnormality type "e7" containing the abnormality occurrence point as a point to access the target unit and the abnormality content as an I2C device abnormality. Then, the flow proceeds to step S161 from which the abnormal point determination unit 31*a* performs the "notification of the access result to the operating SVC".

On the other hand, when the reading value from the I2C device is determined to be not an impossible value for the I2C device (No in step S135), the abnormal point determination unit 31*a* determines whether or not the operation to the I2C device of the target unit 3 includes writing (step S137). When the writing is not included (i.e., reading only) in the operation to the I2C device of the target unit 3 (No in step S137), the flow proceeds to step S151 from which the abnormal point determination unit 31*a* performs "determination of an abnormality in disconnection from the target unit".

When the writing is included in the operation to the I2C device of the target unit 3 (Yes in step S137), the flow proceeds to step S141 from which the abnormal point determination unit 31*a* performs "determination of an abnormality in writing to the target unit".

Standby SVC: Determination of Abnormality in Writing to Target Unit

Next, the abnormal point determination unit 31*a* writes data in a register of the I2C device of the target unit 3 connected from the side of the standby SVC (step S141). Subsequently, the abnormal point determination unit 31*a* determines whether or not there is an abnormality in access to the I2C device (step S142). When there is an abnormality in the access to the I2C device (Yes in step S142), the abnormal point determination unit 31a stores an abnormality type containing a point of the abnormality occurrence and a content of the abnormality as an access result in the storage unit 40 (step S143). Herein, the abnormality type "e6" is stored in the storage unit 40, the abnormality type "e6" containing the abnormality occurrence point as a point to access the target unit and the abnormality content as an I2C sequence abnormality. Then, the flow proceeds to step S161 from which the abnormal point determination unit 31a performs the "notification of the access result to the operating SVC".

On the other hand, when there is no abnormality in the access to the I2C device (No in step S142), the abnormal point determination unit 31a reads the data in the register of the I2C device of the target unit 3 so that the written data is checked (step S144), the register having undergone the writing. Then, the abnormal point determination unit 31a determines whether or not there is an abnormality in access to the I2C device (step S145). When there is an abnormality in the access to the I2C device (Yes in step S145), the abnormal point determination unit 31a stores an abnormality type containing a point of the abnormality occurrence and a content of the abnormality as an access result in the storage unit 40 (step S146). Herein, the abnormality type "e6" is stored in the storage unit 40, the abnormality type "e6" containing the abnormality occurrence point as a point to access the target unit and the abnormality content as an I2C sequence abnormality. Then, the flow proceeds to step S161 from which the abnormal point determination unit 31a performs the "notification of the access result to the operating SVC".

On the other hand, when there is no abnormality in the access to the I2C device (No in step S145), the abnormal point determination unit 31a determines whether or not the writing to the I2C device is incorrectly performed (step S147). Specifically, the abnormal point determination unit 31a compares the data which has been written in the register of the I2C device with the data which has been read from the same register, and determines whether or not these data are not the same. When the writing is incorrectly performed to the I2C device (Yes in step S147), the abnormal point determination unit 31a stores an abnormality type containing a point of the abnormality occurrence and a content of the abnormality as an access result in the storage unit 40 (step S148). Herein, the abnormality type "e7" is stored in the storage unit 40, the abnormality type "e7" containing the abnormality occurrence point as a point to access the target unit and the abnormality content as an I2C device abnormality. Then, the flow proceeds to step S161 from which the abnormal point determination unit 31a performs the "notification of the access result to the operating SVC".

On the other hand, when the writing is correctly performed to the I2C device (No in step S147), the flow proceeds to step S151 from which the abnormal point determination unit 31a performs the "determination of an abnormality in disconnection from the target unit".

Standby SVC: Determination of Abnormality in Disconnection from Target Unit

Next, the abnormal point determination unit 31a disconnects the I2C-MUX 20 on the standby SVC from the target unit 3 through the I2C sequence control unit 32 (step S151). Then, the abnormal point determination unit 31a determines whether or not there is an abnormality in access to the I2C-MUX 20 (step S152). When there is an abnormality in the access to the I2C-MUX 20 (Yes in step S152), the abnormal point determination unit 31a stores an abnormality type containing a point of the abnormality occurrence and a content of the abnormality as an access result in the storage unit 40 (step S153). Herein, the abnormality type "e8" is stored in the storage unit 40, the abnormality type "e8" containing the abnormality occurrence point as a point in which the disconnection of the I2C-MUX 20 from the target unit 3 is confirmed and the abnormality content as an I2C sequence abnormality. Then, the flow proceeds to step S161 from which the abnormal point determination unit 31a performs the "notification of the access result to the operating SVC".

When there is an abnormality in the access to the I2C-MUX 20 (No in step S152), the abnormal point determination unit 31a reads a connection state of the I2C-MUX 20 on the standby SVC with the target unit 3 (step S154). Then, the abnormal point determination unit 31a determines whether or not there is an abnormality in the access to the I2C-MUX 20 by use of a register of the I2C-MUX 20 (step S155). When there is an abnormality in the access to the I2C-MUX 20 (Yes in step S155), the abnormal point determination unit 31a stores an abnormality type containing a point of the abnormality occurrence and a content of the abnormality as an access result in the storage unit 40 (step S156). Herein, the abnormality type "e9" is stored in the storage unit 40, the abnormality type "e9" containing the abnormality occurrence point as a point in which the disconnection of the I2C-MUX 20 from the target unit 3 is confirmed and the abnormality content as an I2C sequence abnormality. Then, the flow proceeds to step S161 from which the abnormal point determination unit 31a performs the "notification of the access result to the operating SVC".

When there is no abnormality in the access to the I2C-MUX 20 (No in step S155), on the other hand, the abnormal point determination unit 31a determines whether or not the I2C-MUX 20 is in a non-connected state (step S157). When the I2C-MUX 20 is not in the non-connected state (No in step S157), the I2C-MUX 20 is not in the non-connected state as expected. Thus, the abnormal point determination unit 31a stores an abnormality type containing a point of the abnormality occurrence and a content of the abnormality as an access result in the storage unit 40 (step S158). Herein, the abnormality type "e10" is stored in the storage unit 40, the abnormality type "e10" containing the abnormality occurrence point as a point in which the disconnection of the I2C-MUX 20 from the target unit 3 is confirmed and the abnormality content as an I2C device abnormality. Then, the flow proceeds to step S161 from which the abnormal point determination unit 31a performs the "notification of the access result to the operating SVC".

On the other hand, when the I2C-MUX 20 is determined to be in the non-connected state (Yes in step S157), the abnormal point determination unit 31a allows a result in which the access to the target unit 3 has been normally performed to be stored in the storage unit 40 (step S159). Then the flow proceeds to step S162 from which the abnormal point determination unit 31a performs "notification of an access result to the operating SVC".

Standby SVC: Notification of Access Result to Operating SVC

FIG. 20 is a flowchart illustrating a procedure for notifying the operating SVC of an access result.

When the access to the target unit 3 has an abnormality, the abnormal point determination unit 31a resets the I2C-MUX 20 on the standby SVC through the FPGA (step S161). When the access to the target unit 3 is normally performed, the abnormal point determination unit 31a does not reset the I2C-MUX 20 on the standby SVC.

The abnormal point determination unit 31a notifies the operating SVC of the process results (access results) stored in the storage unit 40 through communication between the FPGAs (step S162), and the determination of the abnormality in the standby SVC ends.

Advantages of Embodiments

According to the above embodiment, the I2C bus device 9 includes the I2C master unit 1A and the I2C master unit 1B which is redundant with the I2C master unit 1A. The I2C master unit 1A and the I2C master unit 1B control a plurality of I2C slave units 3 connected by the I2C bus. When an abnormality is detected in access to the I2C slave unit 3, the I2C master unit 1A can determine a unit having an abnormality by a combination of an access result relating to a point in which the abnormality is detected and an access result from the I2C master unit 1B. According to such a configuration, the I2C bus device 9 uses the combination of the two access results with respect the abnormality detected in the access to the I2C slave unit 3, thereby determining which unit has the abnormality. For example, when two access results indicate that abnormalities are provided in the substantially same point, the I2C bus device 9 can determine that the I2C slave unit 3 has the abnormality instead of the I2C master units 1A and 1B. Moreover, when the I2C master unit 1A has an abnormality while the I2C master unit 1B does not have an abnormality, the I2C bus device 9 can determine that the I2C master unit 1A has the abnormality.

According to the above embodiment, in the I2C bus device 9, the abnormal point determination unit 31a determines whether or not there is an abnormal point in access to the I2C slave unit 3 connected with the unit thereof. When the abnormal point determination unit 31a determines that there is an abnormal point in the access to the I2C slave unit 3, the access request unit 31b requests the I2C master unit 1B to access the same I2C slave unit 3. Moreover, the abnormal unit determination unit 31c determines a unit having an abnormality by use of a combination of an access result relating to the abnormal point determined by the abnormal point determination unit 31a and an access result indicating a result of the request made by the access request unit 31b. According to such a configuration, the abnormal point determination unit 31a determines the unit having an abnormality by use of a combination of the access result determined to have the abnormal point and the access result indicating the result of the request made by the access request unit 31b, so that the abnormal point determination unit 31a can determine which unit has the abnormality.

According to the above embodiment, moreover, the I2C master unit 1A includes the abnormal unit determination matrix 41. The abnormal unit determination matrix 41 stores therein a candidate unit to be determined to be abnormal by a combination of abnormality determination information of one of the redundant master units and abnormality determination information of the other redundant master unit with respect to an abnormal point in a master unit in which there is the possibility of an abnormality. Moreover, the abnormal unit determination unit 31c determines a unit which causes the abnormality in the access to the I2C slave unit 3 by use of the combination of the abnormality determination information of each of the redundant master units, the abnormality determination information being stored in the abnormal unit determination matrix 41. According to such a configuration, the combination of the abnormality determination information is fragmented and stored in the abnormal unit determination matrix 41, so that the abnormal unit determination unit 31c can more accurately determine a unit having the abnormality.

Moreover, according to the above embodiment, the abnormality determination information relating to the abnormal point includes a point having the possibility of an abnormality and a content of the abnormality in the point. According to such a configuration, the abnormality determination information can include a plurality of abnormality contents with respect to one possible point of the abnormality, thereby increasing variation in the abnormality determination information. Therefore, the abnormal unit determination unit 31c can determine the abnormal unit with more accuracy.

Other

According to the embodiment, the description has been made on the case where the I2C master unit 1A serving as an operating SVC determines an abnormal unit in a case where when there is an abnormality in access to the target unit 3 during operation of the I2C bus device 9. However, the embodiment is not limited thereto. For example, a process of abnormal unit determination may be performed even when the I2C bus device 9 is not in operation. For example, the I2C bus device 9 may perform a fault diagnosis of a unit between I2C buses beforehand.

Each of the components in the devices illustrated in the drawings may not need to be physically provided as illustrated. That is, a structure of each of the devices, particularly, a structure of disintegration and integration of the devices, is not limited thereto. Alternatively, all of or a part of the devices may be mechanically or physically disintegrated or integrated into an optional unit depending on loads or usage conditions. For example, the access request unit 31b and the abnormal unit determination unit 31c may be integrated as one unit. Moreover, the various functional units disposed in the I2C device control unit 31 may be integrated as one unit. On the other hand, the abnormal point determination unit 31a may be disintegrated according to various functions thereof. For example, the abnormal point determination unit 31a may be disintegrated into an arbitration unit for arbitrating between an operating system and a standby system, an abnormal point determination unit for the arbitrated operating system, and an abnormal point determination unit for the arbitrated standby system. In such a case, the abnormal point determination unit for the arbitrated standby system may be disintegrated into a standby unit for awaiting an access request from the operating system, an abnormal point determination unit, and a notification unit for notifying an access result. Moreover, the storage unit 40 may be connected via network to serve as an external device of the I2C bus device 9.

Moreover, all of or a part of the process functions to be performed by the I2C bus device 9 may be executed by a CPU (or microcomputer such as microprocessor (MPU) and micro controller unit (MCU)) or by hardware with wired logic. Moreover, all of or a part of the process functions to be performed by the I2C bus device 9 may be executed by a program that is run by CPU (or microcomputer such as MPU and MCU).

An information processing apparatus according to an embodiment of the present invention can determine which I2C unit has an abnormality when there is an abnormality in any of the I2C units connected to an I2C bus.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing apparatus comprising:
    a first master unit configured to control a plurality of slave units and serve as an operating system; and
    a second master unit configured to control the plurality of slave units and serve as an standby system, the first master unit and the second master unit being connected one-to-one with each of the slave units by a bus,
    the first master unit including a control unit that requests the second master unit to check the connection to a target slave unit when an abnormality is detected in access from the first master unit to the target slave unit, and determines a unit having the abnormality by use of an access result relating to a point in which the abnormality is detected and an access result of access from the second master unit to the target slave unit.

2. The information processing apparatus according to claim 1, wherein the control unit includes:
    an abnormal point determination unit that determines whether or not there is an abnormal point in access to the slave unit connected to the first master unit;
    an access request unit that requests the second master unit to access a specific slave unit when the abnormal point is determined to exist in the access to the specific slave unit by the abnormal point determination unit; and
    an abnormal unit determination unit that determines a unit having an abnormality by use of a combination of an access result relating to the abnormal point determined to have the abnormality by the abnormal point determination unit and an access result indicating a result of a request made by the access request unit.

3. The information processing apparatus according to claim 1, wherein
    the first master unit includes a storage unit that stores therein a candidate unit which is determined to be abnormal by a combination of the access information of one of the redundant master units and the access information of the other redundant master unit with respect to access information relating to a point which has a possibility of an abnormality in the master unit in the access to the slave unit, and
    the abnormal unit determination unit determines a unit which causes the abnormality in the access to the slave unit by use of a combination of the access information of each of the redundant master units, the access information being stored in the storage unit.

4. The information processing apparatus according to claim 3, wherein the access information includes a point in which there is a possibility of an abnormality and a content of the abnormality in the point.

5. A control device configured to control a plurality of slave units comprising:
    a control unit that requests a second control device configured to control the Plurality of slave units to check the connection to a target slave unit when an abnormality is detected in access from the control device to the target slave unit, the control device and the second control device being connected one-to-one with each of the slave units by a bus, and determines a unit having the abnormality by use of an access result relating to a point in which the abnormality is detected and an access result of access from the second control device to the target slave unit.

6. A method for determining an abnormal unit executed by an information processing apparatus including a first master unit and a second master unit, the method comprising:
    determining whether or not there is an abnormal point in access to a slave unit by the first master unit configured to control a plurality of slave units and serve as an operation system, the first master unit and the second master unit being connected one-to-one with each of the slave units by a bus;
    requesting the second master unit configured to control the plurality of slave units and serve as an standby system, to access a specific slave unit when the abnormal point is determined to exist in access to the specific slave unit in the determining; and
    determining a unit having an abnormality by use of an access result relating to the abnormal point determined to have an abnormality in the determining and an access result indicating a result of the request made in the requesting by the first master unit.

* * * * *